(12) United States Patent
Gandiboyina et al.

(10) Patent No.: US 12,218,818 B1
(45) Date of Patent: Feb. 4, 2025

(54) MULTICAST LIVENESS DETECTION

(71) Applicant: Juniper Networks, Inc., Sunnyvale, CA (US)

(72) Inventors: Venkata Srikanth Gandiboyina, Cupertino, CA (US); Saravanan Deenadayalan, San Jose, CA (US); Swamy Sadashivaiah Renu Kananda, Tracy, CA (US); Nishant Sharma, Cupertino, CA (US); Vikram P. Rautela, Morgan Hill, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/337,641

(22) Filed: Jun. 20, 2023

(51) Int. Cl.
*H04L 43/12* (2022.01)
*H04L 45/74* (2022.01)
*H04L 65/611* (2022.01)

(52) U.S. Cl.
CPC .............. *H04L 43/12* (2013.01); *H04L 45/74* (2013.01); *H04L 65/611* (2022.05)

(58) Field of Classification Search
None
See application file for complete search history.

(56) References Cited

U.S. PATENT DOCUMENTS

| | | | |
|---|---|---|---|
| 2010/0074150 A1* | 3/2010 | Hersche | H04L 69/40 370/276 |
| 2010/0161960 A1* | 6/2010 | Sadasivan | H04L 63/1408 713/152 |
| 2021/0243048 A1* | 8/2021 | Thein | H04L 47/6295 |
| 2022/0131939 A1* | 4/2022 | Pang | H04L 45/74 |
| 2022/0191130 A1* | 6/2022 | Nainar | H04L 45/20 |
| 2022/0239584 A1* | 7/2022 | Sharma | H04L 12/18 |
| 2023/0035653 A1* | 2/2023 | Piedra Camacho | H04L 47/62 |
| 2023/0038749 A1* | 2/2023 | Bahadur | H04L 49/113 |

FOREIGN PATENT DOCUMENTS

CN 115167769 A * 10/2022
KR 1011414034 B1 * 7/2014

* cited by examiner

*Primary Examiner* — Younes Naji
(74) *Attorney, Agent, or Firm* — Harrity & Harrity, LLP

(57) ABSTRACT

In some implementations, a first packet forwarding device (PFD) may obtain a probe packet. The first PFD may replicate the probe packet forming multiple copies of the probe packet. The first PFD may transmit, to the first PFD and to multiple other PFDs, the multiple copies of the probe packet. The first PFD may receive a first copy of the probe packet and multiple response packets, with the first copy of the probe packet originating at the first PFD, and with each of the multiple response packets originating at a respective one of the multiple other PFDs based on the respective one of the multiple other PFDs receiving one of the multiple copies of the probe packet. The first PFD may determine, based on the first copy of the probe packet and the multiple response packets, a status of multiple links associated with the first PFD.

16 Claims, 24 Drawing Sheets

MULTICAST LIVENESS DETECTION

BACKGROUND

Data may be transmitted to recipients over a network, such as a packet-based network. In some examples, certain traffic may be delivered to multiple destinations contemporaneously. In some examples, point-to-single-point delivery, or unicast, techniques may be used to deliver traffic to multiple destinations. When unicast techniques are used, a copy of the traffic is sent from the sender to each recipient. In some other examples, multicast techniques may be used to deliver traffic to multiple destinations contemporaneously. In multicasting, to conserve bandwidth and/or other network resources, traffic may be transmitted over each link of the network only once, with the traffic replicated (e.g., copied) when the links to the destinations split.

SUMMARY

In some implementations, a method includes obtaining, at a first packet forwarding device, a probe packet; replicating, by the first packet forwarding device, the probe packet forming multiple copies of the probe packet; transmitting, by the first packet forwarding device to the first packet forwarding device and multiple other packet forwarding devices, the multiple copies of the probe packet; receiving, by the first packet forwarding device, a first copy of the probe packet, of the multiple copies of the probe packet, and multiple response packets, wherein the first copy of the probe packet originates at the first packet forwarding device, and wherein each of the multiple response packets originates at a respective one of the multiple other packet forwarding devices based on the respective one of the multiple other packet forwarding devices receiving one of the multiple copies of the probe packet; and determining, based on the first copy of the probe packet and the multiple response packets, a status of multiple links associated with the first packet forwarding device.

In some implementations, a first packet forwarding device includes one or more memories; and one or more processors to: replicate a probe packet forming multiple replicated probe packets; transmit a replicated probe packet, of the multiple replicated probe packets, to each of multiple packet forwarding devices via a respective output queue; receive, in response to transmitting the multiple replicated probe packets, one or more response packets; and determine, based on the one or more response packets, a liveness of one or more output queues.

In some implementations, a packet forwarding system includes multiple packet forwarding devices, each packet forwarding device, of the multiple packet forwarding devices, including one or more memories and one or more processors to: replicate a packet forming multiple copies of the packet; transmit, to other packet forwarding devices of the multiple packet forwarding devices, the multiple copies of the packet; receive multiple response packets, wherein each of the multiple response packets originates at a respective one of the other packet forwarding devices based on the respective one of the other packet forwarding devices receiving one of the multiple copies of the packet; and determine, based on the multiple response packets, a reachability of multiple links associated with the multiple packet forwarding devices.

DETAILED DESCRIPTION

Figure 1A:
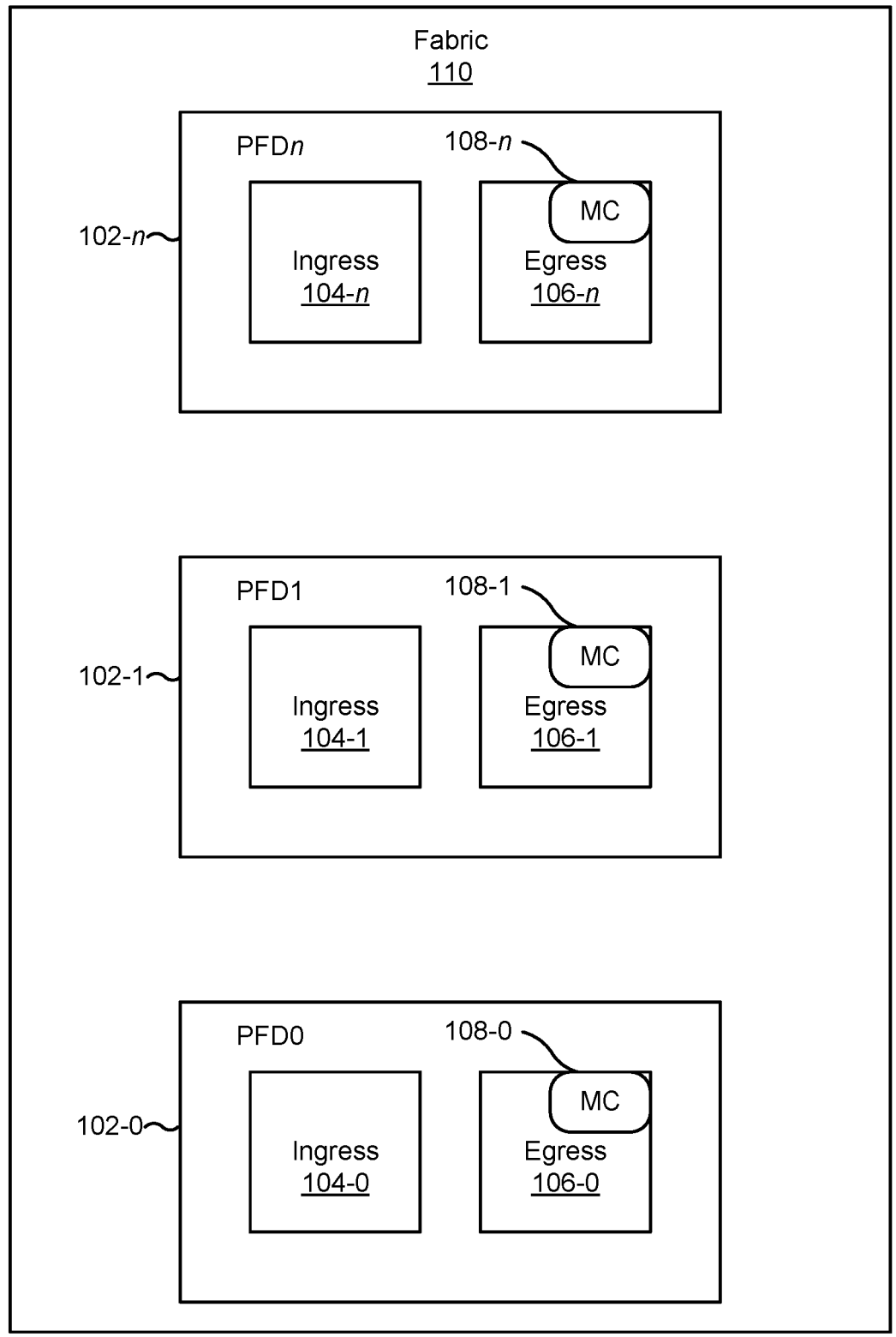
FIGS. 1A-1C are diagrams of an example packet forwarding device (PFD) system associated with multicast replication.

The following detailed description of example implementations refers to the accompanying drawings. The same reference numbers in different drawings may identify the same or similar elements.

In network routing systems, a packet forwarding device (PFD) (sometimes referred to as a packet forwarding engine (PFE)) may be associated with an application specific integrated circuit (ASIC) chipset or similar component configured to forward traffic to other PFDs and/or other network destinations, such as via a network fabric (sometimes referred to as a switch fabric). In some examples, a PFD may be associated with an ingress component (sometimes referred to as an ingress block) configured to receive packets from certain network components and/or inject packets into a PFD system, an egress component (sometimes referred to as an egress block) configured to forward received packets to other network components and/or output packets from a PFD system, and/or a multicast component (sometimes referred to as a multicast block and/or a multicast engine (MCE)) configured to replicate packets destined for multiple output locations. In some examples, a multicast component may be associated with ingress multicast replication, while, in some other examples, a multicast component may be associated with egress multicast replication. In ingress multicast replication, a multicast component may be located at, or otherwise associated with, an ingress component of the PFD, and in egress multicast application, a multicast component may be located at, or otherwise associated with, an egress component of the PFD. Additionally, a PFD may be associated with a PFD software component that is capable of providing certain forwarding instructions and/or similar inputs for execution by an ASIC chipset or similar component associated with the PFD. For example, a PFD software component may build a multicast tree that may indicate one or more destinations of one or more packets being replicated by the multicast component. In some examples, the multicast tree may be a unary tree, while, in some other examples the multicast tree may be a binary tree. Moreover, in some examples, the multicast component may be associated with static replication, while, in some other examples, the multicast tree may be associated with dynamic replication.

In some examples, it may be desirable to validate a multicast replication path (sometimes referred to as multicast reachability and/or liveness detection), such as for purposes of ensuring that multicast traffic is reaching all intended destinations, ensuring that no PFDs associated with a multicast replication path are inoperable (sometimes referred to as a PFD being wedged), ensuring that links between multiple PFDs in a multicast tree are operable, or for similar purposes. However, for certain ASIC-based PFD systems referred to as fixed-pipeline platforms, in which the ASIC chipset cannot be programmed to communicate with other PFDs, there is no existing mechanism to validate the multicast replication path and/or to determine a liveness and/or reachability of a remote PFD. This may be because multicast verification typically requires multiple PFDs and/or components thereof to be involved in the verification of the multicast replication pipelines, and certain fixed-pipeline PFDs may not have a capability of accommodating such features. More particularly, PFDs associated with a fixed-pipeline architecture may not have a capability of being programmed to perform certain communication and/or validation tasks, such as validation of a PFD's multicast component to detect any wedge at the multicast component, validation of local replication toward egress ports of the PFD (e.g., line card central processing unit (LCPU) ports, direct loop back (DLB) ports, and/or other egress ports associated with the PFD), validation of fabric replication toward a remote PFD (e.g., to validate a remote PFD's reachability and/or liveness), or the like. Moreover, although some PFDs associated with a fixed-pipeline architecture may be associated with a host loopback wedge detection component, host loopback wedge detection may not cover the multicast component and/or may not detect errors at an ingress and/or egress pipeline associated with the PFD. Accordingly, existing host loopback wedge detection techniques may be inadequate for validating remote PFD reachability and/or liveness.

Moreover, multicast trees may include different combinations of PFDs based on an outgoing interface (OIF) list, and thus there may be a need to check inter-PFD multicast connectivity between any two given PFDs in a system for multicast blackhole detection or for a similar purpose. However, using a given platform's multicast tree type, connectivity between any two PFDs in a system may not be tested using all PFDs (e.g., for a unary tree using all PFDs in the system, only one PFD reachability may be tested from a given PFD). For example, in a three-PFD system that includes PFDs indexed as PFD1, PFD2, and PFD3, a unary multicast tree may include PFD1→PFD2→PFD3. Thus, the multicast tree may not be used to test PFD1→PFD3 liveness and/or reachability. Although multiple multicast trees may be used test each combination of PFDs, this may result in high fabric token usage. For example, returning to the three-PFD system described above, in order to validate connectivity between each pair of PFDs, six fabric tokens (e.g., PFD1→PFD2, PFD1→PFD3, PFD2→PFD1, PFD2→PFD3, PFD3→PFD1, and PFD3→PFD2), plus an additional two tokens for a response and a local central processing unit (CPU) copy, may need to be constructed, resulting in high resource consumption and inefficient usage of power, computing, and network resources.

Some implementations described herein enable systems and methods for validating multicast replication in a multi-PFD system, such as validating a reachability and/or liveness of remote PFDs, detecting a wedge at a multicast component (e.g., MCE) of a PFD, or the like. Some implementations may utilize a probe packet and a flat replication tree that includes all PFDs in a system in order to test all PFD reachability from any given PFD. For example, a source PFD may replicate a probe packet to all other PFDs in a system in order to test reachability and/or liveness of the remote PFDs and/or associated virtual output queues (VOQs). The source PFD may also locally replicate the probe packet to a host CPU (e.g., LCPU) associated with the source PFD in order to test the source PFD's local path. Upon successfully receiving the probe packet, each remote PFD may perform single local replication (e.g., each remote PFD may replicate the probe packet to a corresponding LCPU), and PFD software associated with each remote PFD may transmit a response packet back to the source PFD. The source PFD (more particularly, PFD software associated with the source PFD) may perform bookkeeping on all received response packets to ensure a packet is timely received from the local PFD and each remote PFD, thereby validating liveness and/or reachability of the remote PFD and/or validating multicast replication at the source PFD and/or the remote PFDs. As a result, multicast replication may be efficiently validated in a multi-PFD system, resulting in reduced multicast transmission errors and thus reduced resource consumption otherwise required to correct multicast transmission errors, while consuming minimal resources (e.g., while consuming only two to three fabric tokens, sometimes referred to as F-labels, regardless of a total number of PFDs in a system), resulting in improved network operations and efficiency.

Figure 1B:
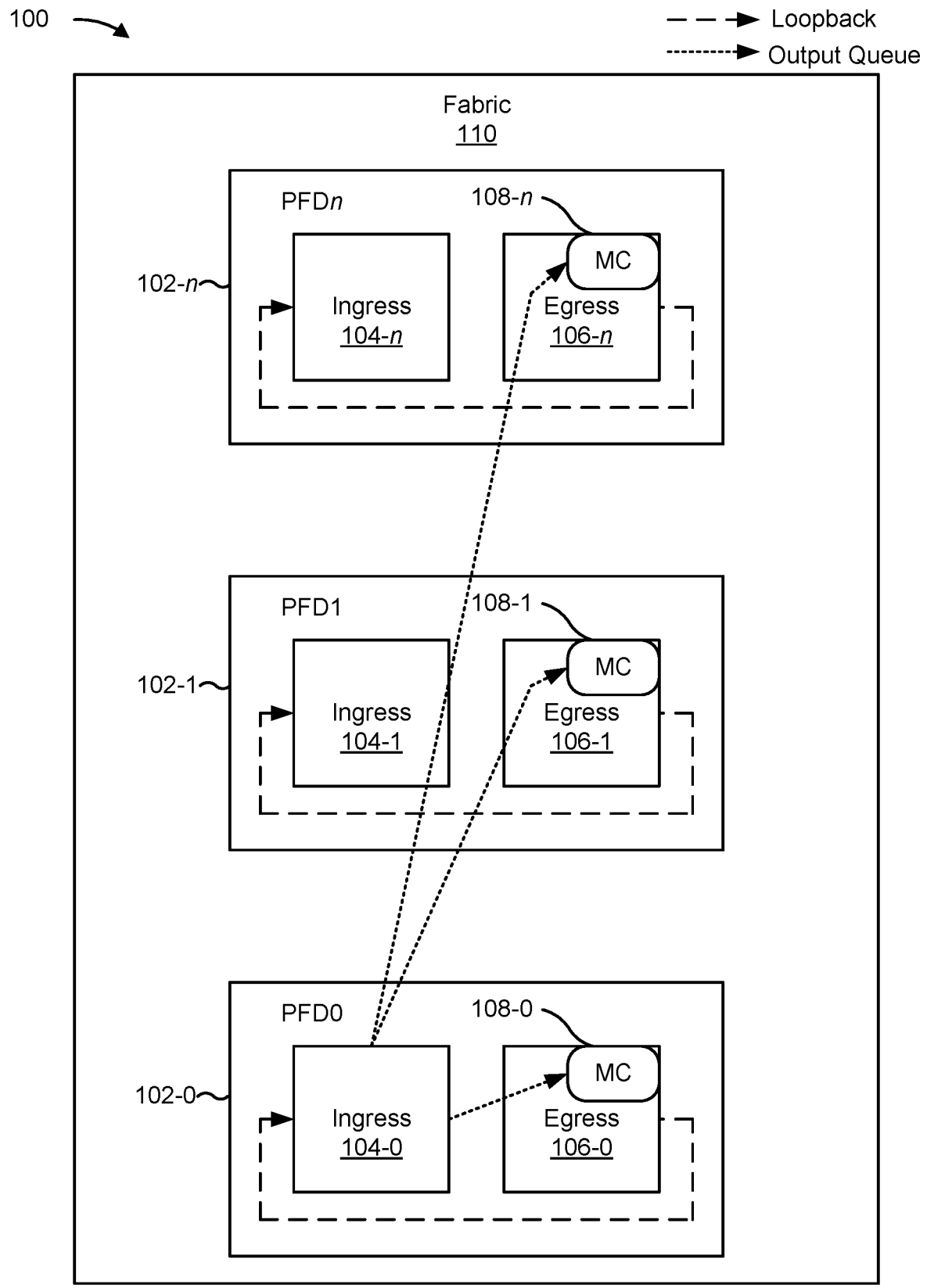
Figure 1C:
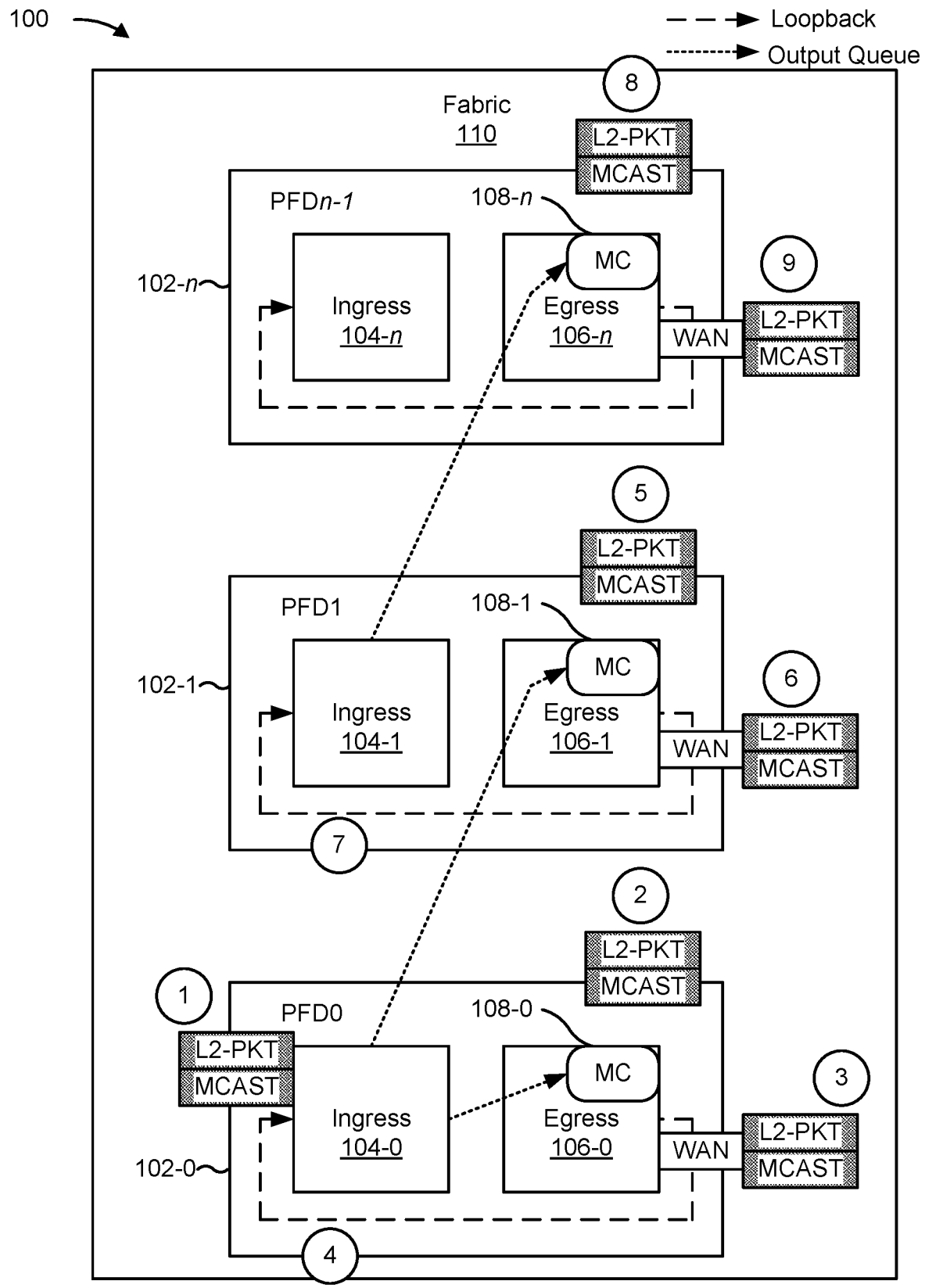

FIGS. 1A-1C are diagrams of an example PFD system 100 associated with multicast replication. As shown in FIGS. 1A-1C, the PFD system 100 includes multiple (e.g., N) PFDs 102 (shown as a first PFD 102-0, indexed as PFD0, through an N-th PFD 102-*n*, indexed as PFDn, with n being equal to N-1). In some implementations, the PFDs 102 may be associated with an ASIC chip or chipset, the PFDs 102 may be fixed-pipeline devices (e.g., fixed-pipeline line cards), and/or the PFD system 100 may be a fixed-pipeline system. In some examples, each PFD 102 may include an ingress component 104 (shown as ingress components 104-0 through 104-*n*, corresponding to PFDs 102-0 through 102-*n*, respectively), an egress component 106 (shown as egress components 106-0 through 106-*n*, corresponding to PFDs 102-0 through 102-*n*, respectively), and/or a multicast component 108 (shown as multicast components 108-0 through 108-*n*, corresponding to PFDs 102-0 through 102-*n*, respectively). In egress multicast replication examples, the multicast component 108 may be associated with a respective egress component 106 of a PFD 102, as shown in FIG. 1B. In some other examples, such as in ingress multicast replication examples, the multicast component 108 may be associated with a respective ingress component 104 of a PFD 102. The PFDs 102 may be operatively connected to each other via a fabric 110 (e.g., a switch fabric). These devices and components are described in more detail below in connection with FIGS. 3-5.

As shown in FIG. 1B, a PFD 102 may be in communication with itself and/or one or more other PFDs 102 and/or components via a loopback, an output queue (e.g., a VOQ), and/or a similar link. A loopback may be associated with a link that routes packets back to a source of the packet. For example, the loopback associated with the first PFD 102-0 may route packets from the first PFD 102-0 back to itself, and, more particularly, from the egress component 106-0 of the first PFD 102-0 to the ingress component 104-0 of the first PFD 102-0. Similarly, the loopback associated with the second PFD 102-1 may route packets from the egress component 106-1 of the second PFD 102-1 to the ingress component 104-1 of the second PFD 102-1, and/or the loopback associated with the N-th PFD 102-*n* may route packets from the egress component 106-*n* of the N-th PFD 102-*n* to the ingress component 104-*n* of the N-th PFD 102-*n*.

An output queue (e.g., a VOQ) may be a dedicated queue associated with an output location and/or destination (e.g., a logical destination). For example, in FIG. 1B, the ingress component 104-0 of the first PFD 102-0 may be associated with at least three output queues, one associated with a link between the first PFD 102-0 (e.g., the ingress component 104-0 of the first PFD 102-0) and a multicast component 108 of each remote PFD 102 (e.g., the second PFD 102-1 and the N-th PFD 102-n in the example shown in FIG. 1B). More particularly, a first output queue (e.g., a first VOQ) may be associated with a logical destination associated with the first multicast component 108-0, a second output queue (e.g., a second VOQ) may be associated with a logical destination associated with the second multicast component 108-1, and an N-th output queue (e.g., an N-th VOQ) may be associated with a logical destination associated with the N-th multicast component 108-n. In that regard, the ingress component 104-0 of the first PFD 102-0 may be configured to transmit packets to the multicast components 108 of the various PFDs 102 via the various output queues (e.g., VOQs) shown in FIG. 1B. Similarly, the ingress components 104 of the other PFDs 102 may similarly be associated with multiple output queues, such that the respective ingress component 104 of each PFD 102 may be configured to transmit packets to the multicast components 108 of the other PFDs 102.

FIG. 1C shows an example packet flow for a multicast transmission associated with the PFD system 100. More particularly, FIG. 1C shows an example of how packets may be replicated at a PFD 102 and/or transmitted via the fabric 110 to other PFDs 102 (e.g., to multicast components 108 of other PFDs 102) for a unary multicast tree. As shown by step 1 in FIG. 1C (indicated in FIG. 1C using a circle with the numeral "1" inside), the example packet flow may begin with a packet (e.g., a layer 2 (L2) packet) originating at an ingress component 104 of a PFD 102. For example, an L2 packet (shown as "L2-PKT" in FIG. 1C) may be obtained by the first ingress component 104-0 of the first PFD 102-0, such as from a packet input/output component of software associated with the first PFD 102-0, which is described in more detail below in connection with FIGS. 2A-2Q. In this regard, the first PFD 102-0 (e.g., PFD0) may be referred to as an "ingress PFD" in the example depicted in FIG. 1C. As described in more detail below in connection with FIG. 2C, the packet may include numerous fields and/or information, such as an L2 header, an identifier indicating that the packet is associated with a multicast transmission (shown as "MCAST" in FIG. 1C), among other information.

As shown by steps 2 and 3 in FIG. 1C, the multicast packet may be transmitted from the ingress component 104-0 of the first PFD 102-0 to the egress component 106-0 of the first PFD 106-0, and, more particularly, to the multicast component 108-0 of the first PFD 102-0. The multicast component 108-0 may replicate the multicast packet, such as by copying the packet a quantity of times according to a multicast replication list. In some examples, the multicast packet may be replicated in order to be transmitted to multiple destinations, such as multiple destinations associated with the multicast transmission.

In some examples, the multicast component 108-0 may be configured to perform both local replication (e.g., replication of the multicast packet destined for local output ports of the corresponding PFD 102-0, such as wide area network (WAN) interfaces egressing at the corresponding PFD 102-0) and fabric replication (e.g., replication of the multicast packet for transmission, via the fabric 110, to one or more other PFDs 102 for egressing on WAN interfaces or similar output ports associated with the one or more other PFDs 102). More particularly, in the example shown in FIG. 1C, the multicast packet may be replicated twice at the first multicast component 108-0, with the packet shown by step 2 corresponding to a fabric replication of the packet and the packet shown by step 3 corresponding to a local replication of the packet that is ultimately egressed via a WAN port associated with the first PFD 102-0 (e.g., a WAN port associated with the egress component 106 of the first PFD 102-0). Although for ease of description only a single WAN port is shown in connection with the first PFD 102-0, in some other examples, the first PFD 102-0 (e.g., the egress component 106-0 of the first PFD 102-0) may be associated with multiple WAN ports for which the multicast packet is to be egressed, and thus the local replication pipeline of the multicast component 108-0 may replicate the multicast packet multiple times, one for each WAN port on a local replication list.

In some examples, the first PFD 102-0 (e.g., the ingress PFD 102) may transmit a copy of the multicast packet to a next PFD 102 in a multicast tree or similar list. For example, as shown by step 4 in FIG. 1C, the first PFD 102-0 may transmit a copy of the multicast packet (e.g., the fabric replication of the multicast packet described above in connection with step 2) to the ingress block 104-0 of the first PFD 102-0 via the loopback associated with the first PFD 102-0. The fabric replication of the multicast packet may include an identifier associated with a next PFD 102 to receive the packet. For example, in the example shown in FIG. 1C, an identifier associated with the second PFD 102-1 may be indicated in metadata associated with the fabric replication of the multicast packet. In that regard, the first PFD 102-0 may transmit, via the fabric 110, the replicated packet to a corresponding PFD 102 indicated by the packet. In the example shown in FIG. 1C, the ingress block 104-0 of the first PFD 102-0 may thus transmit, via an associated output queue (e.g., an associated VOQ), the replicated packet to the multicast component 108-1 associated with the second PFD 102-1.

Upon receiving the replicated packet, the multicast component 108-1 of the second PFD 102-1 may perform similar operations as described above in connection with steps 2 and 3. More particularly, as shown by steps 5 and 6 in FIG. 1C, the multicast packet may be replicated by the multicast component 108-1 of the second PFD 102-1. For example, in the example shown in FIG. 1C, the multicast packet may be replicated twice at the second multicast component 108-1, with the packet shown by step 5 corresponding to a fabric replication of the packet and the packet shown by step 6 corresponding to a local replication of the packet that is egressed via a WAN port or similar egress port associated with the second PFD 102-1. Again, the second PFD 102-1 may locally replicate the multicast packet multiple times, such as one for each WAN port on a local replication list.

The process may repeat in a similar manner for each PFD 102 in a multicast tree (e.g., for each of the N PFDs 102 in the multicast tree). In that regard, as shown by step 7 in FIG. 1C, the second PFD 102-1 may transmit a copy of the multicast packet (e.g., the fabric replication of the multicast packet described above in connection with step 5) to the ingress block 104-1 of the second PFD 102-1 via the loopback associated with the second PFD 102-1. The fabric replication of the multicast packet may include an identifier associated with a next PFD 102 to receive the packet. For example, in the example shown in FIG. 1C, an identifier associated with the N-th PFD 102-n may be indicated in metadata associated with the fabric replication of the multicast packet. In that regard, the second PFD 102-1 may transmit, via the fabric 110, the replicated packet to a corresponding PFD 102 indicated by the packet (e.g., indicated in metadata associated with replicated packet). In the example shown in FIG. 1C, the ingress block 104-1 of the second PFD 102-1 may thus transmit, via an associated output queue (e.g., an associated VOQ) the replicated packet to the multicast component 108-n associated with the N-th PFD 102-*n*. As shown by steps 8 and 9 in FIG. 1C, the N-th PFD 102-*n* (e.g., the multicast component 108-*n* of the N-th PFD 1002-*n*) may then replicate the packet one or more times, such as for a purpose of egressing the multicast packet via one or more WAN ports or similar ports associated with the N-th PFD 102-*n* and/or for a purpose of creating a fabric replication of the packet to be transmitted to another PFD 102.

In this regard, the PFD system 100 may be associated with a unary multicast tree, in which each PFD 102 in the PFD system 100 sends a replicated packet to one other PFD 102 (more particularly, to a multicast component 108 of one other PFD 102) for replication and further transmission to additional PFDs 102 in the multicast tree, if necessary. Moreover, in systems such as the PFD system 100, a loopback may be involved at each PFD 102 during multicast replication because egress to another PFD 102 (e.g., a multicast component 108 of another PFD 102) via the fabric 110 may only be accomplished via an ingress component 104 of a PFD 102. In some examples, the PFD system 100 may experience traffic loss, such as when an output queue between two PFDs 102 in the PFD system 100 experiences a connectivity issue and/or when a loopback associated with PFD 102 is wedged or otherwise inoperable. Moreover, in some examples, it may be difficult to identify when traffic loss may be attributed to a multicast component 108 and/or a multicast path associated with a remote PFD 102, because no errors may be detected from a control plane perspective and/or next-hop perspective at a source PFD 102. Accordingly, determining multicast resiliency from a source PFD 102 may be limited, resulting in network errors and high computing, power, and network resource consumption for correcting multicast errors or other errors attributed to remote PFDs 102.

Some techniques and implementations described herein may enable a liveness and/or reachability determination of one or more remote PFDs from a source PFD and/or a status determination of one or more remote PFDs from a source PFD. For example, in some implementations, a probe packet may be injected into a PFD system in order to detect a liveness and/or reachability of one or more remote PFDs with respect to an ingress PFD (sometimes referred to as a source PFD) and/or in order to determine a status of one of one or more remote PFDs (e.g., a status of a local path and/or loopback associated with one or more remote PFDs). Aspects of injecting a probe packet into the PFD system in order to detect a liveness and/or reachability of one or more remote PFDs and/or in order to determine a status of one of one or more remote PFDs are described in more detail below in connection with FIGS. 2A-2Q.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2A:
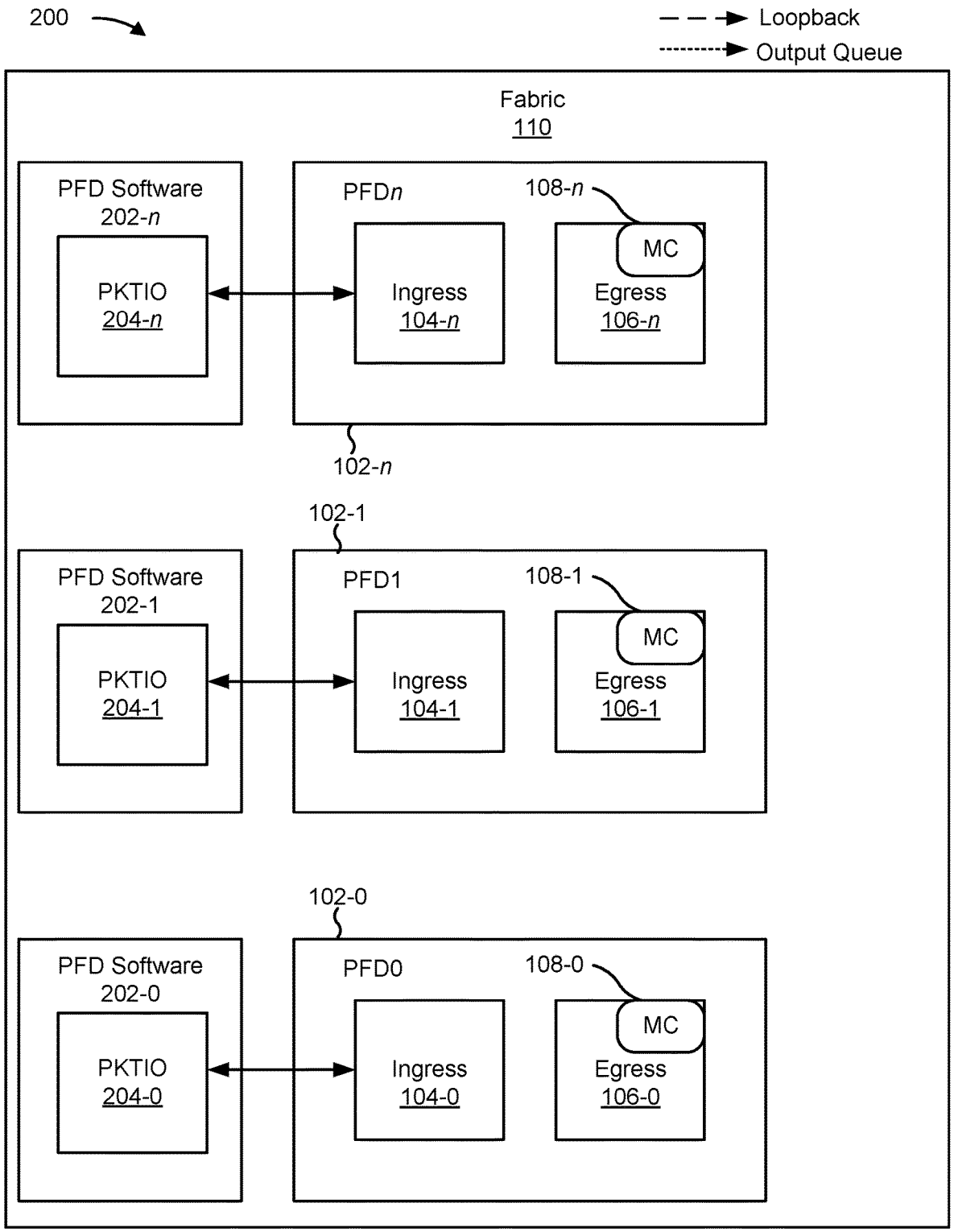
FIGS. 2A-2Q are diagrams of an example PFD system associated with multicast liveness detection.
Figure 2B:
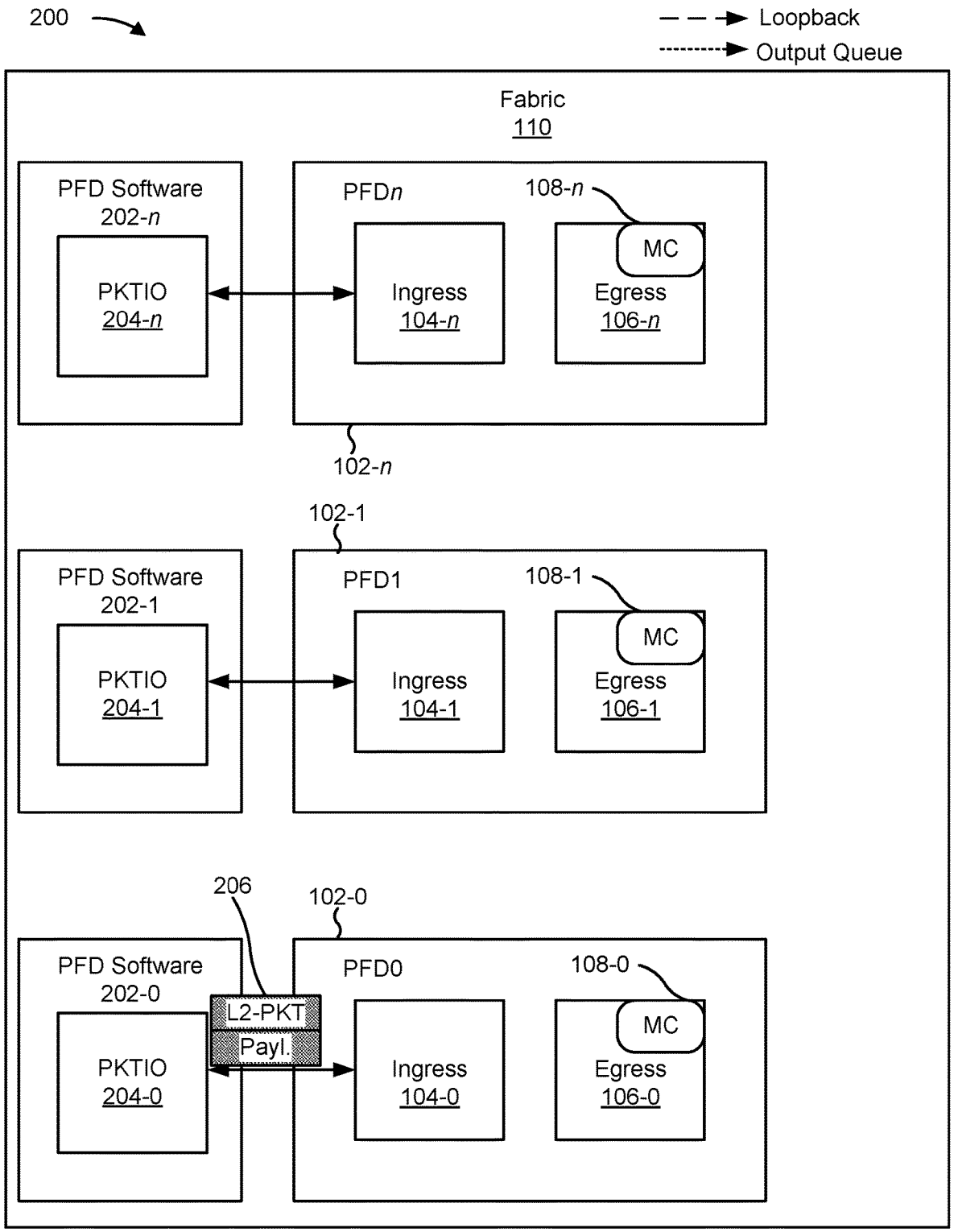
Figure 2C:
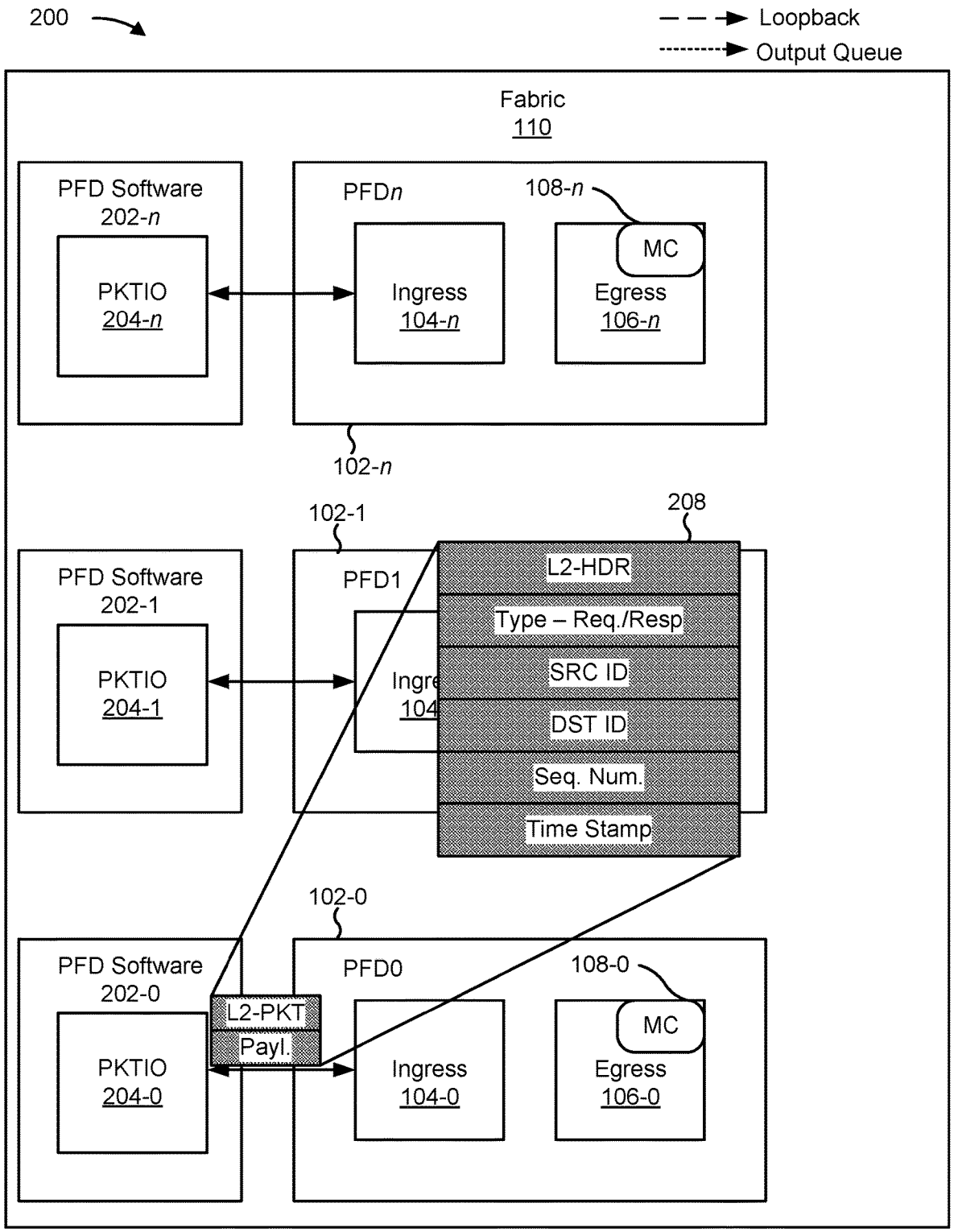
Figure 2D:
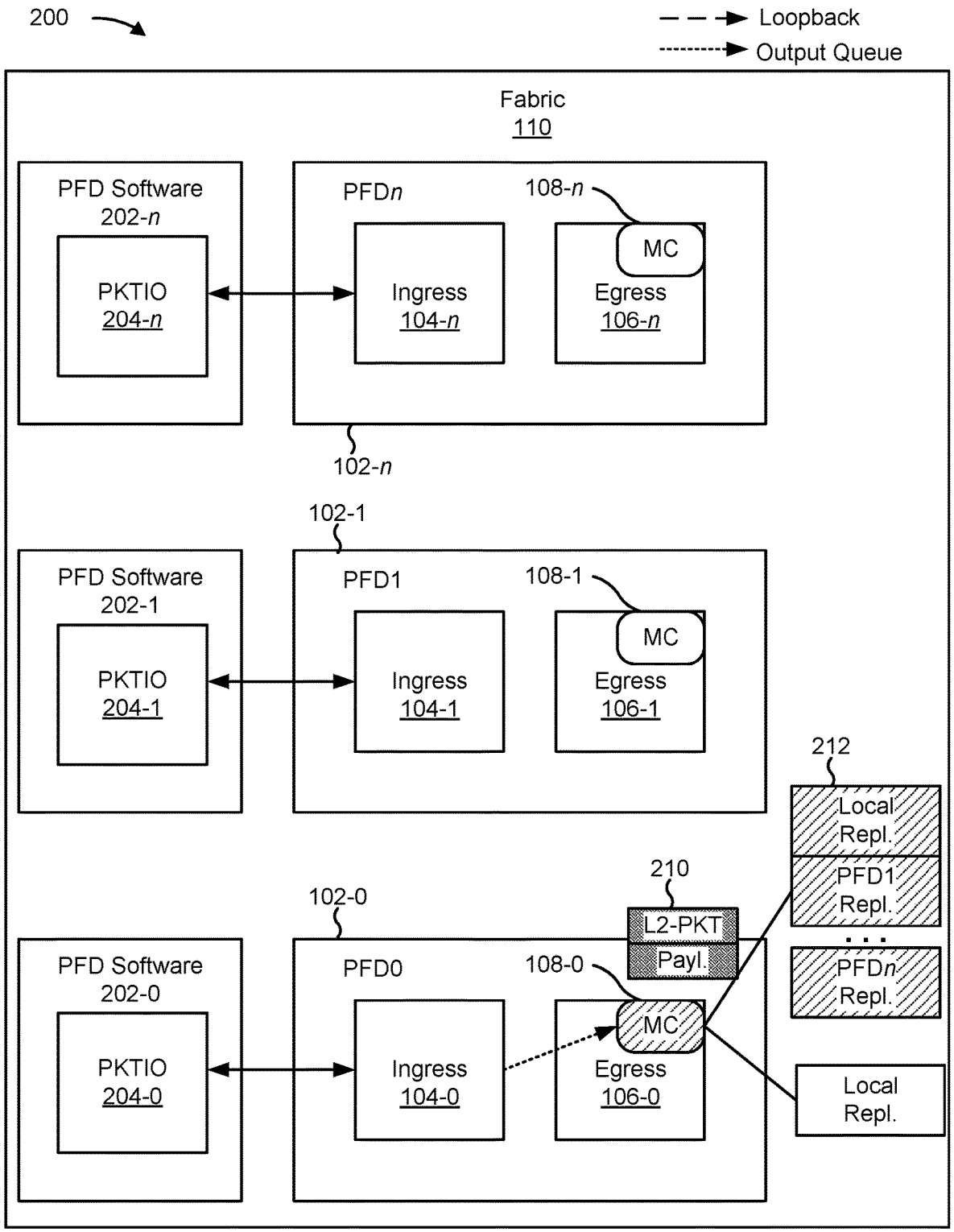
Figure 2E:
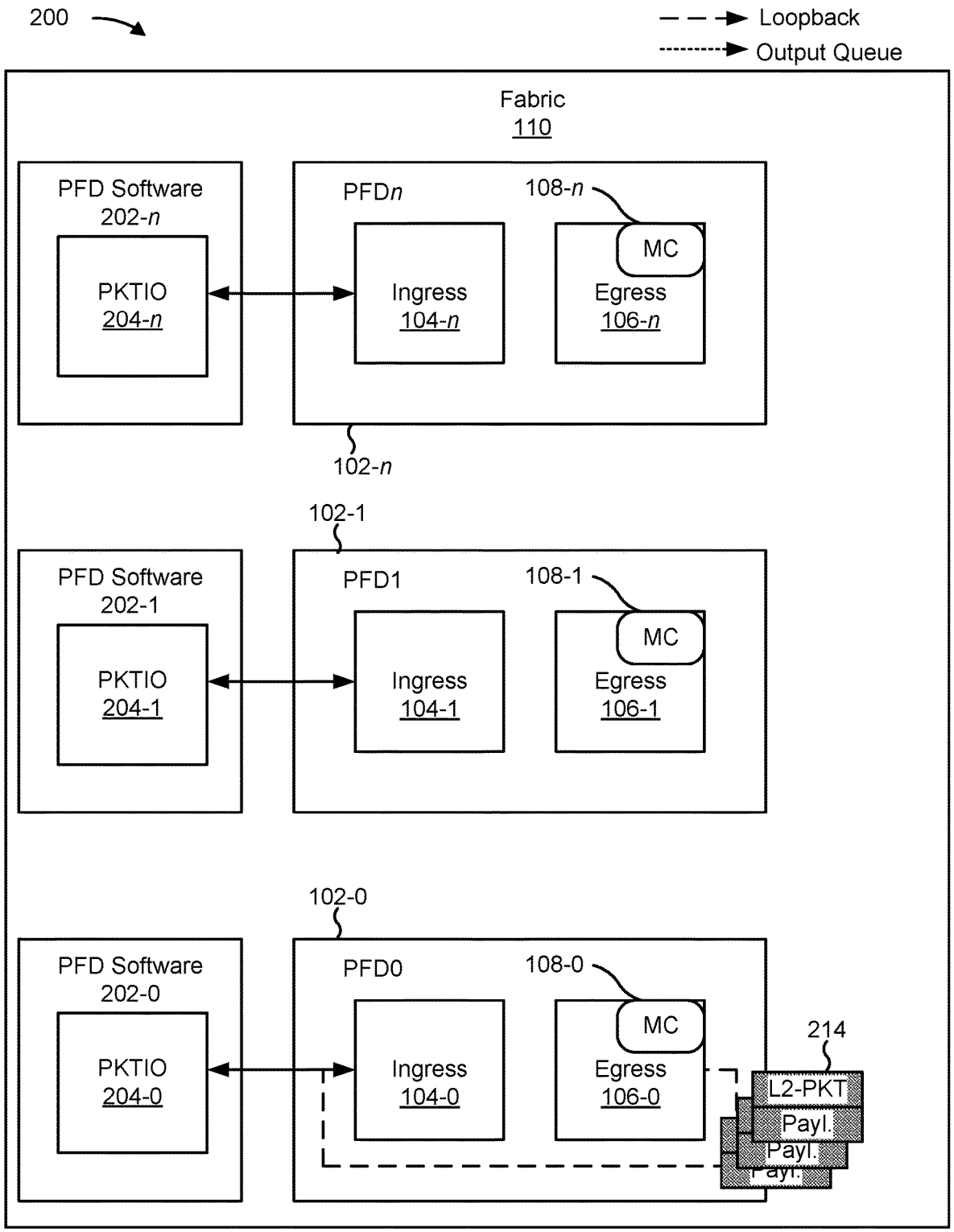
Figure 2F:
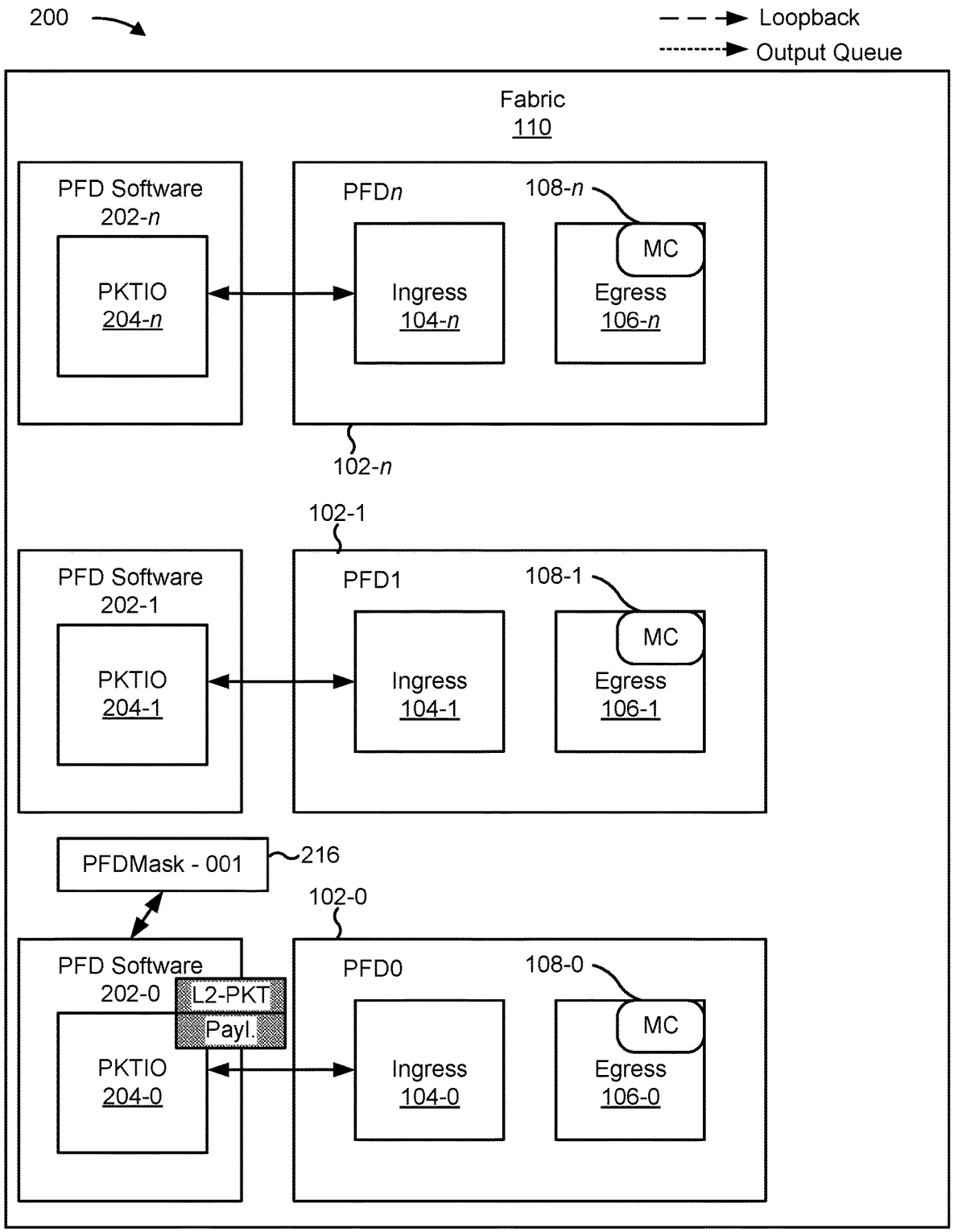
Figure 2G:
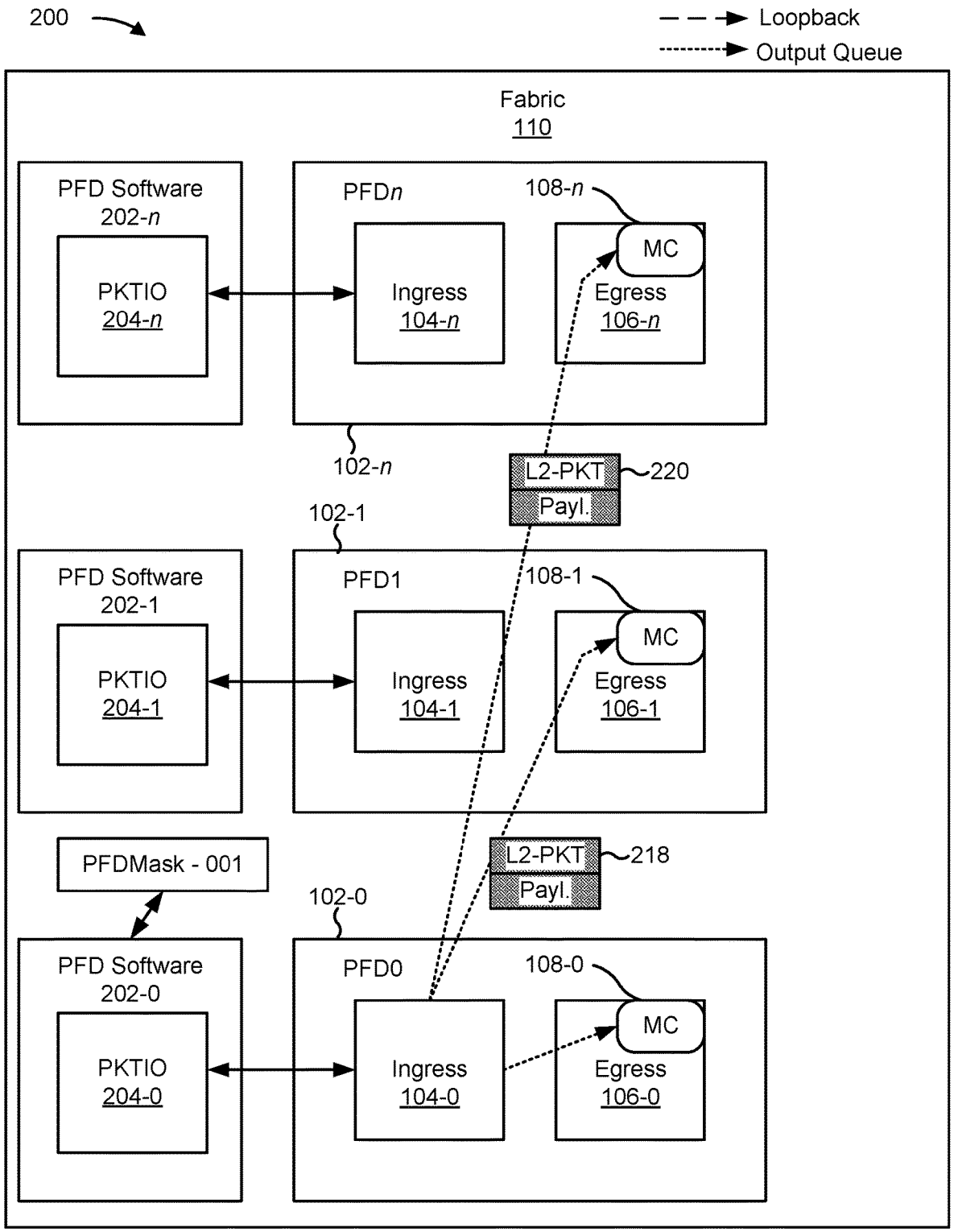
Figure 2H:
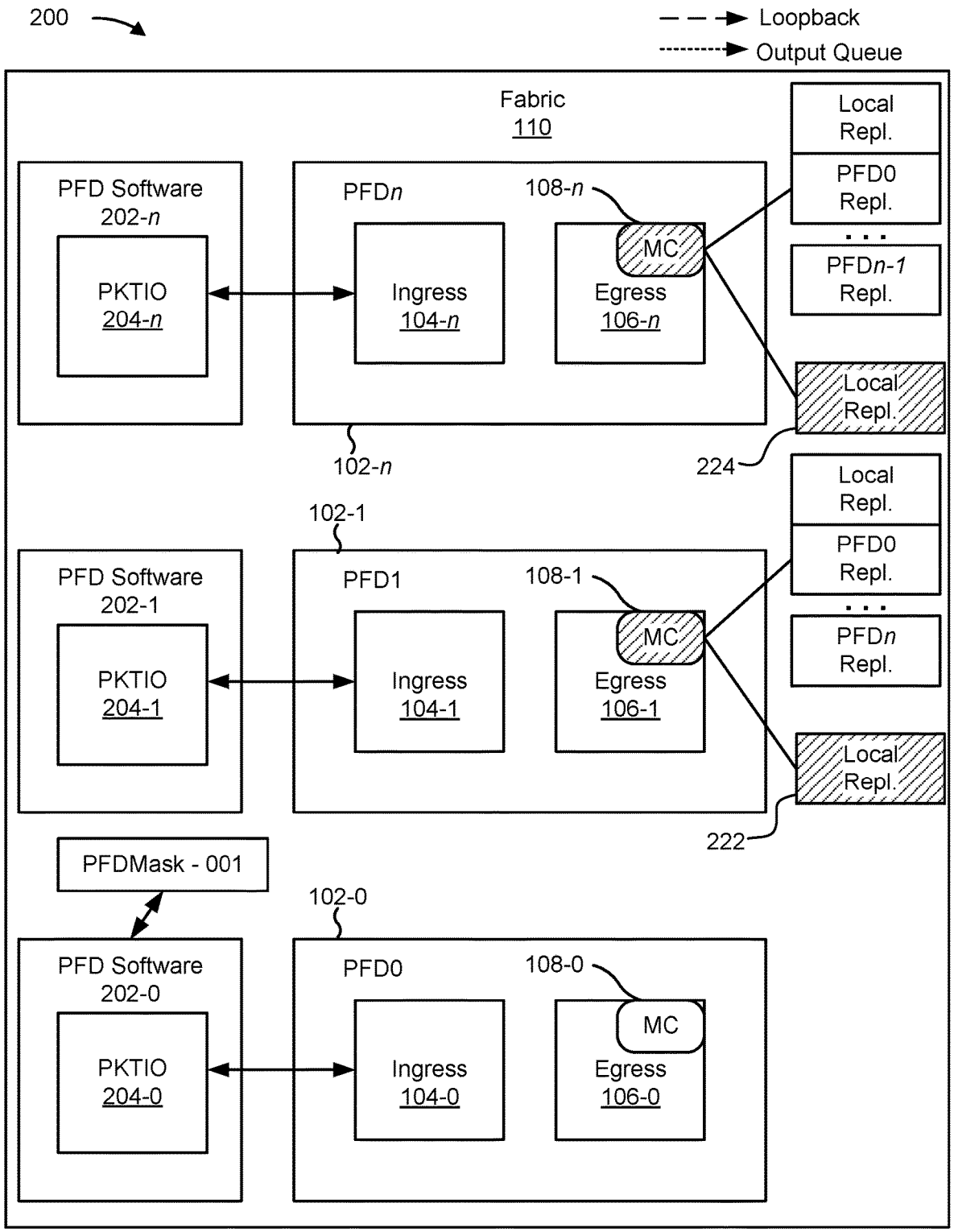
Figure 2I:
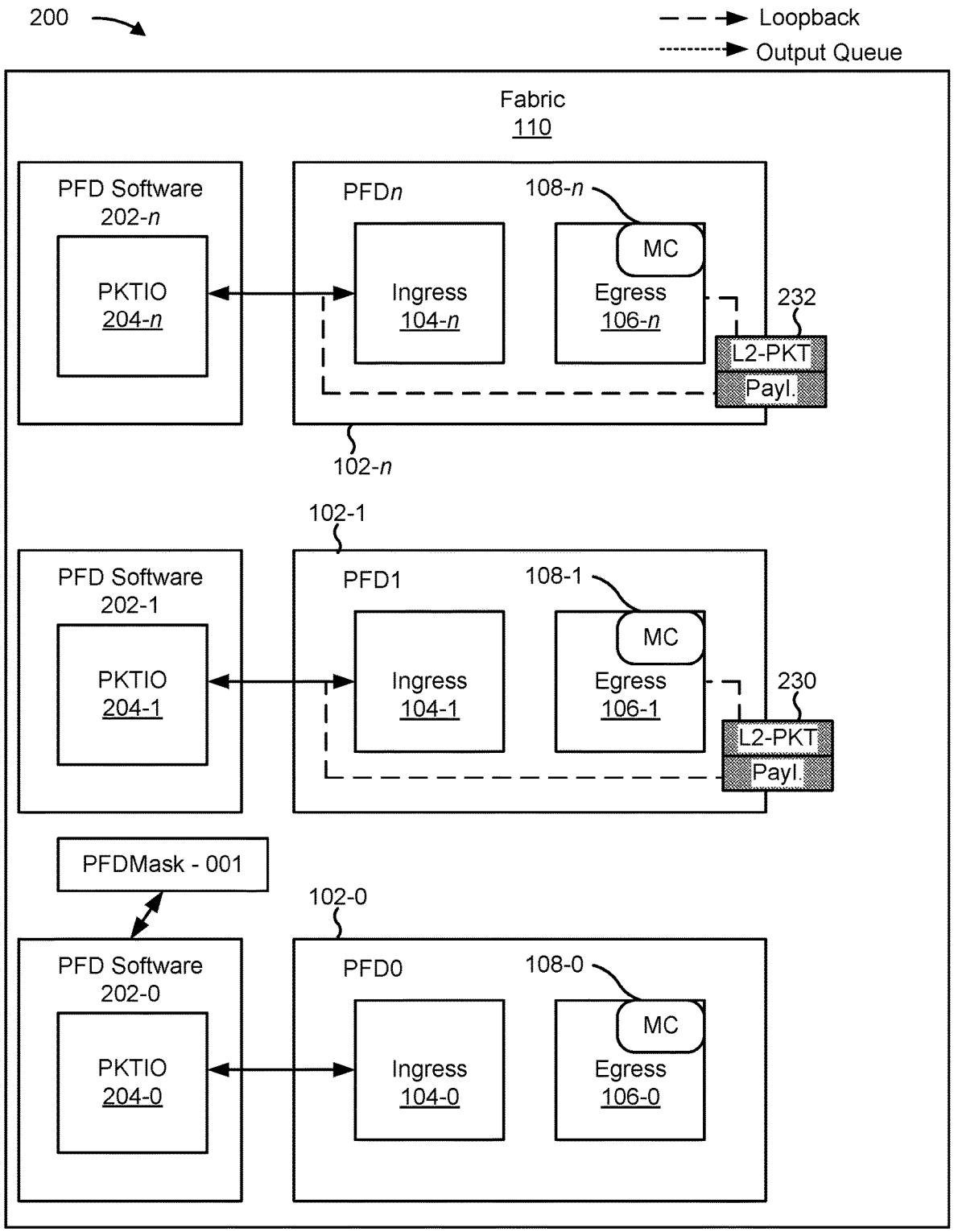
Figure 2J:
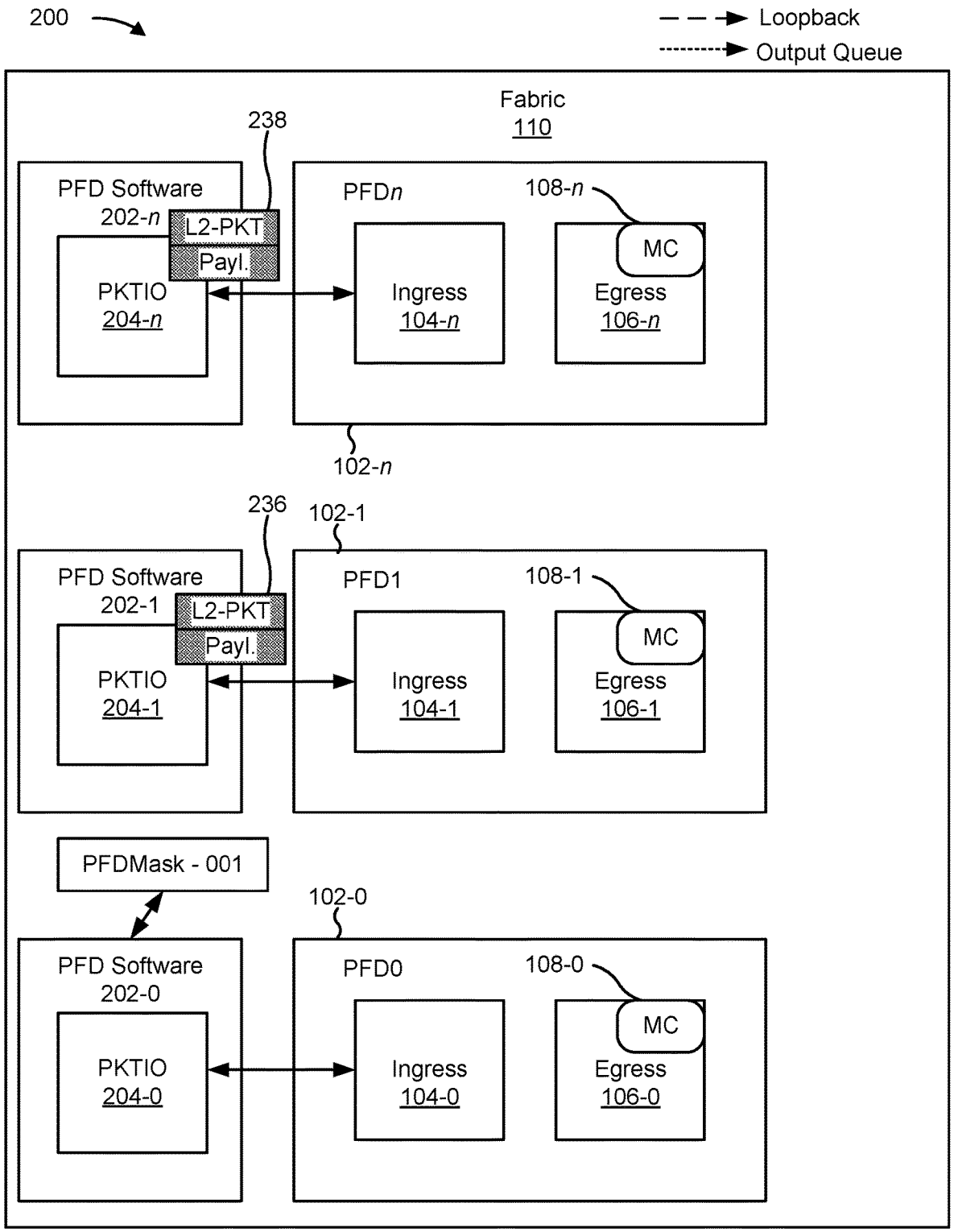
Figure 2K:
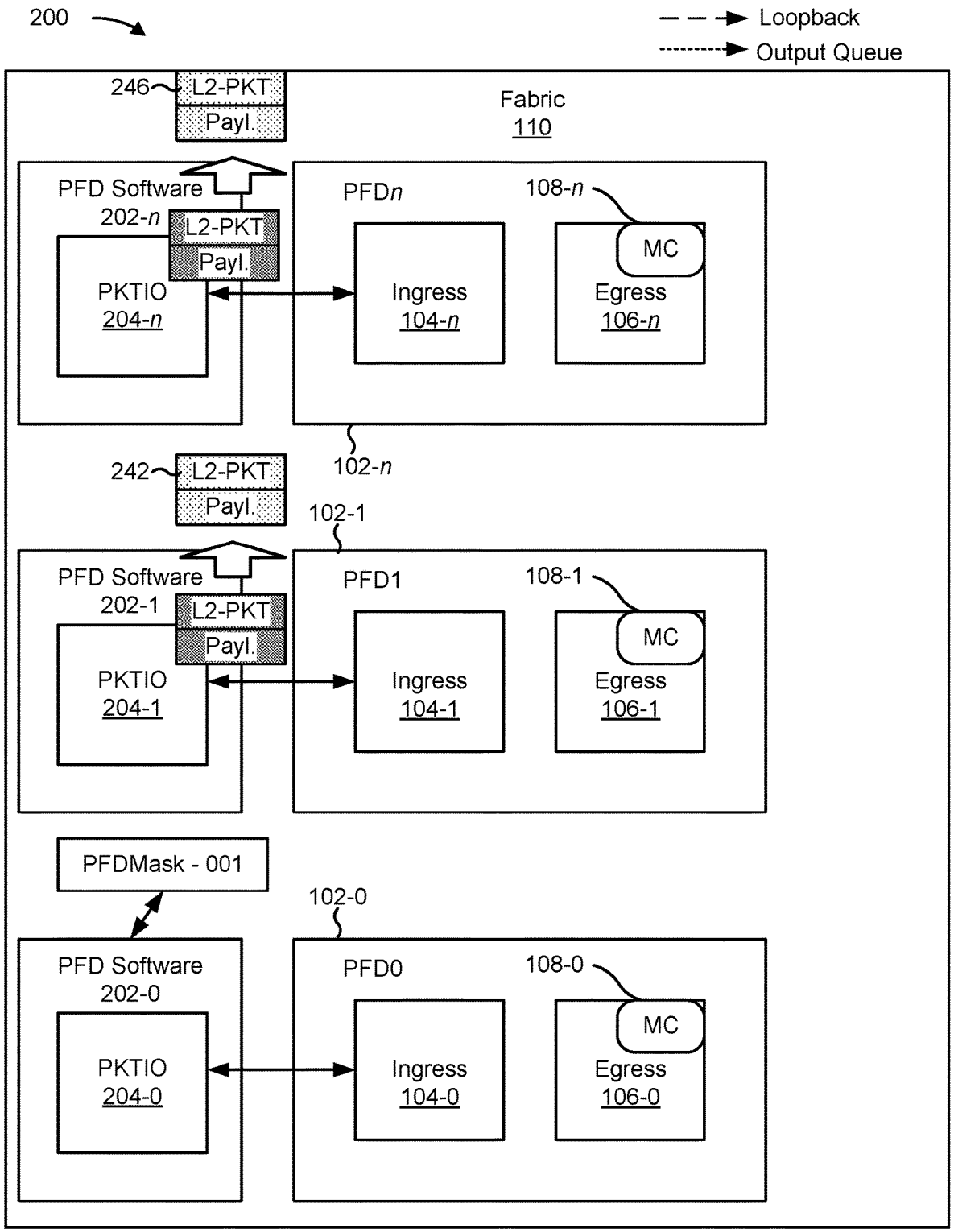
Figure 2L:
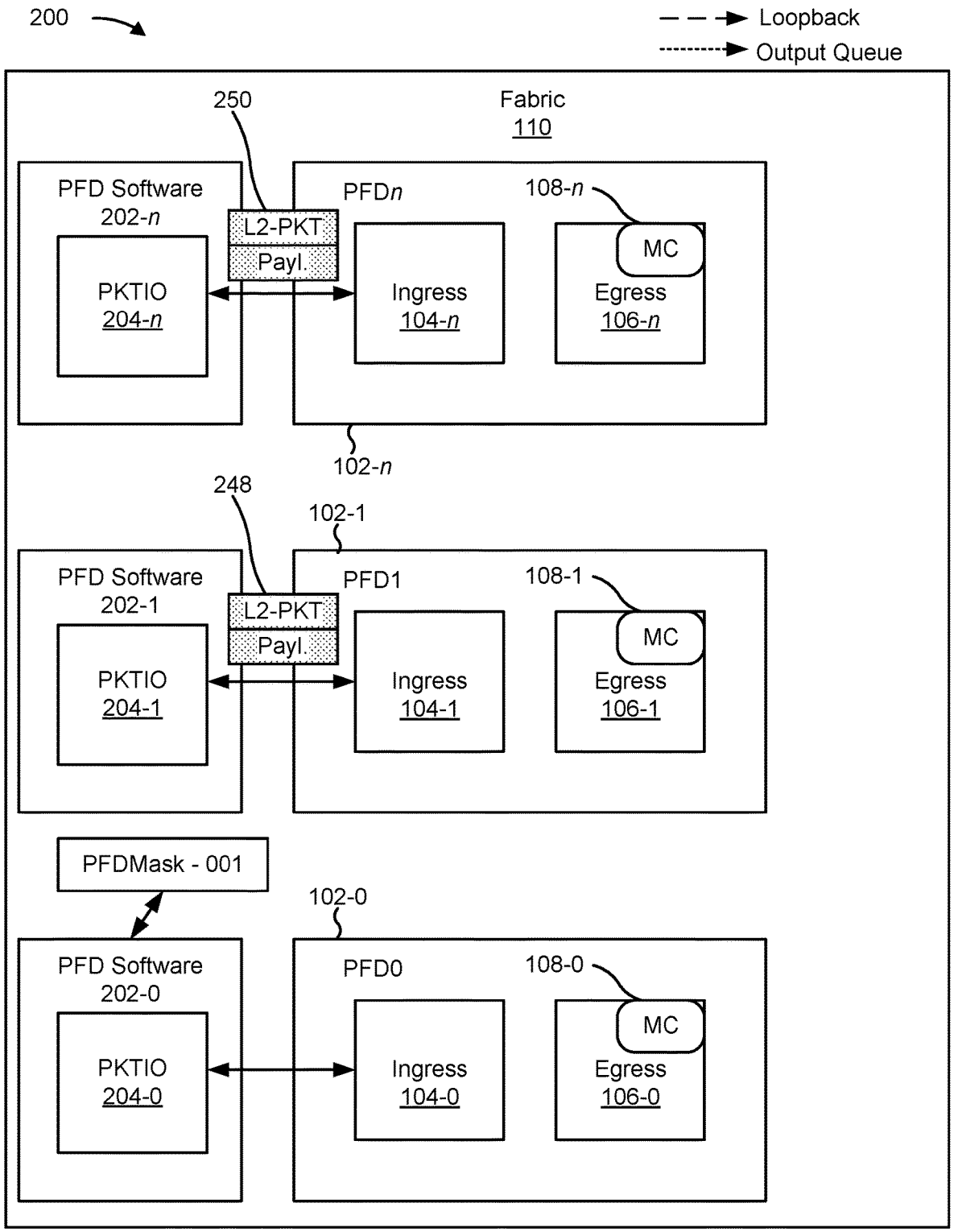
Figure 2M:
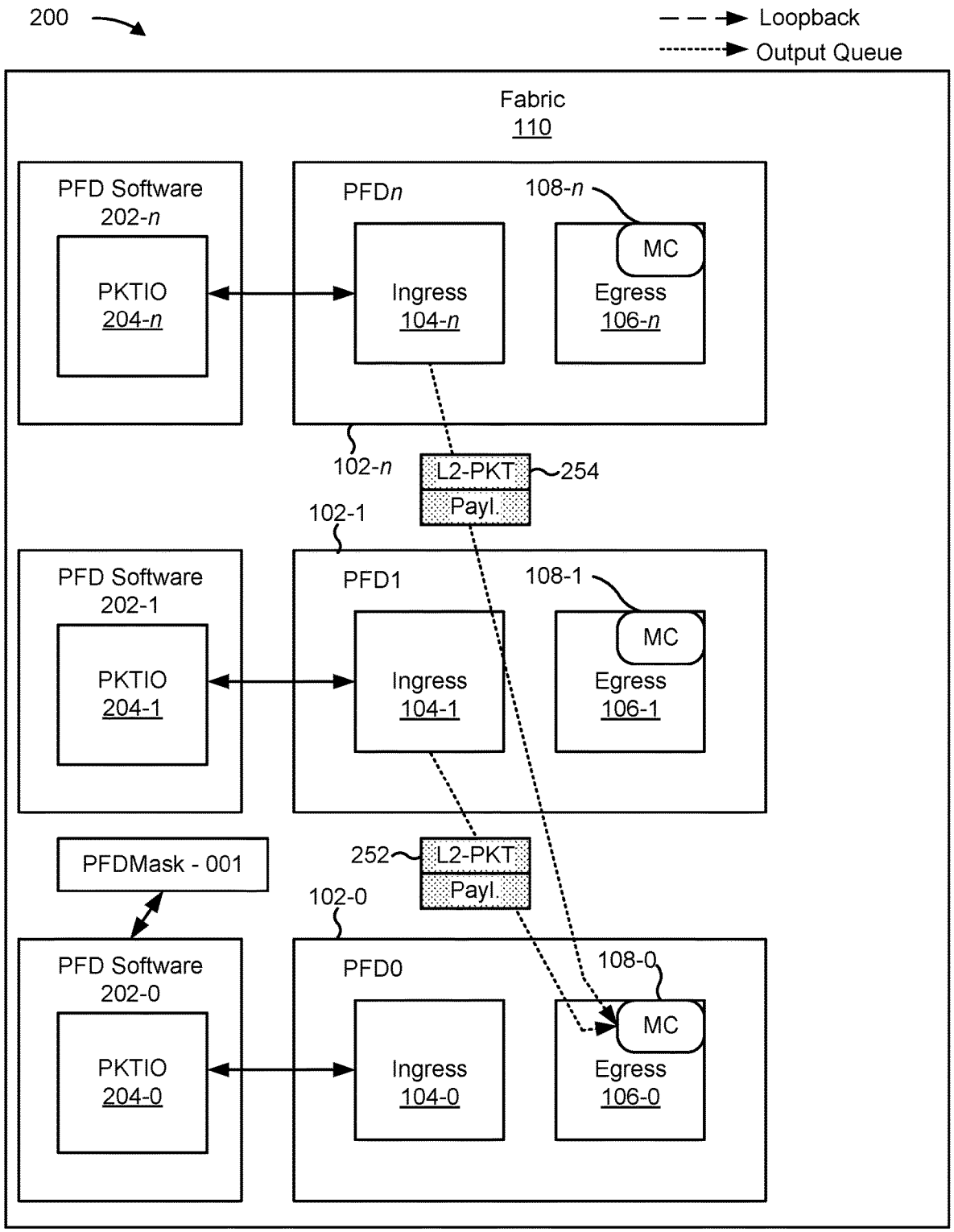
Figure 2N:
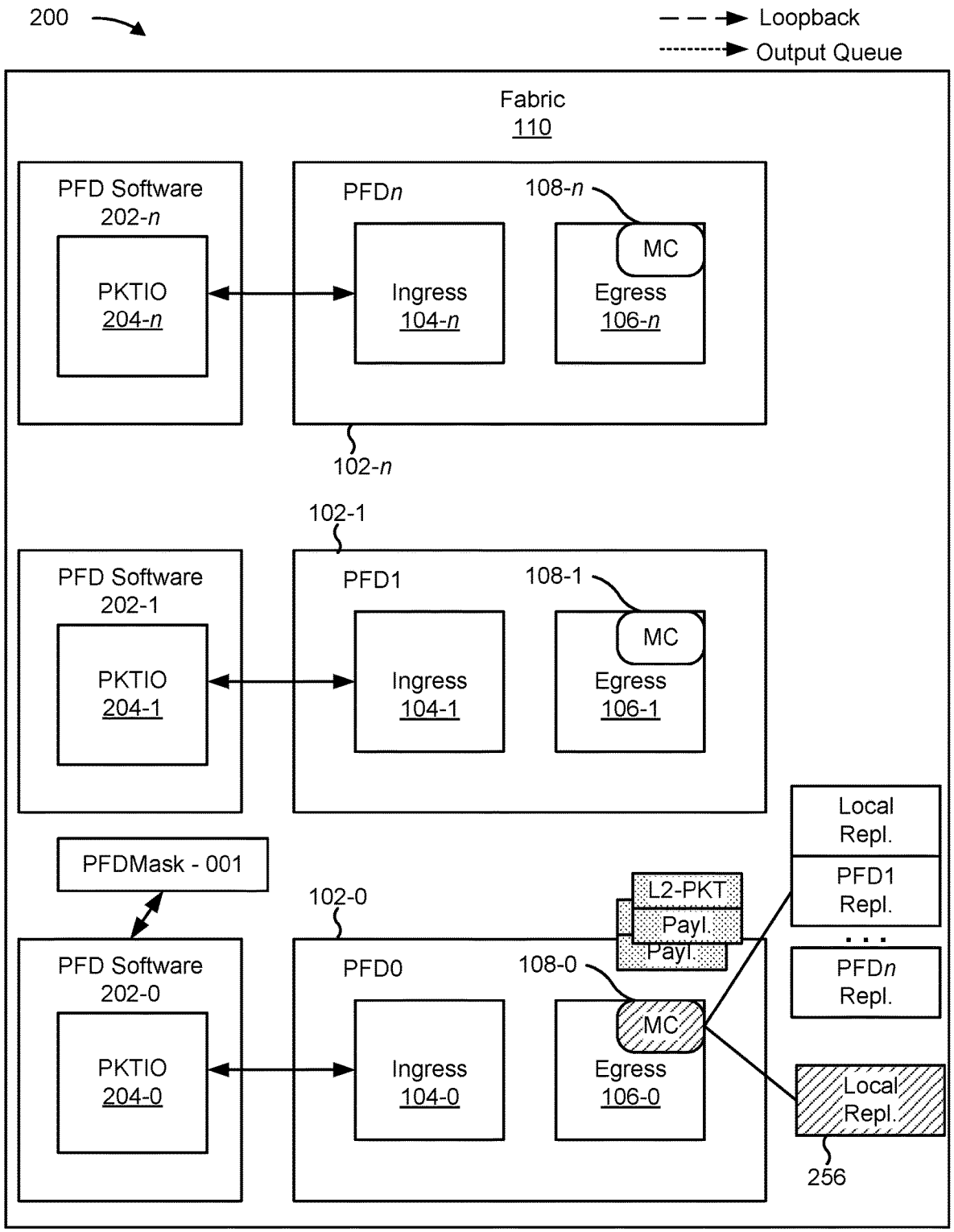
Figure 2O:
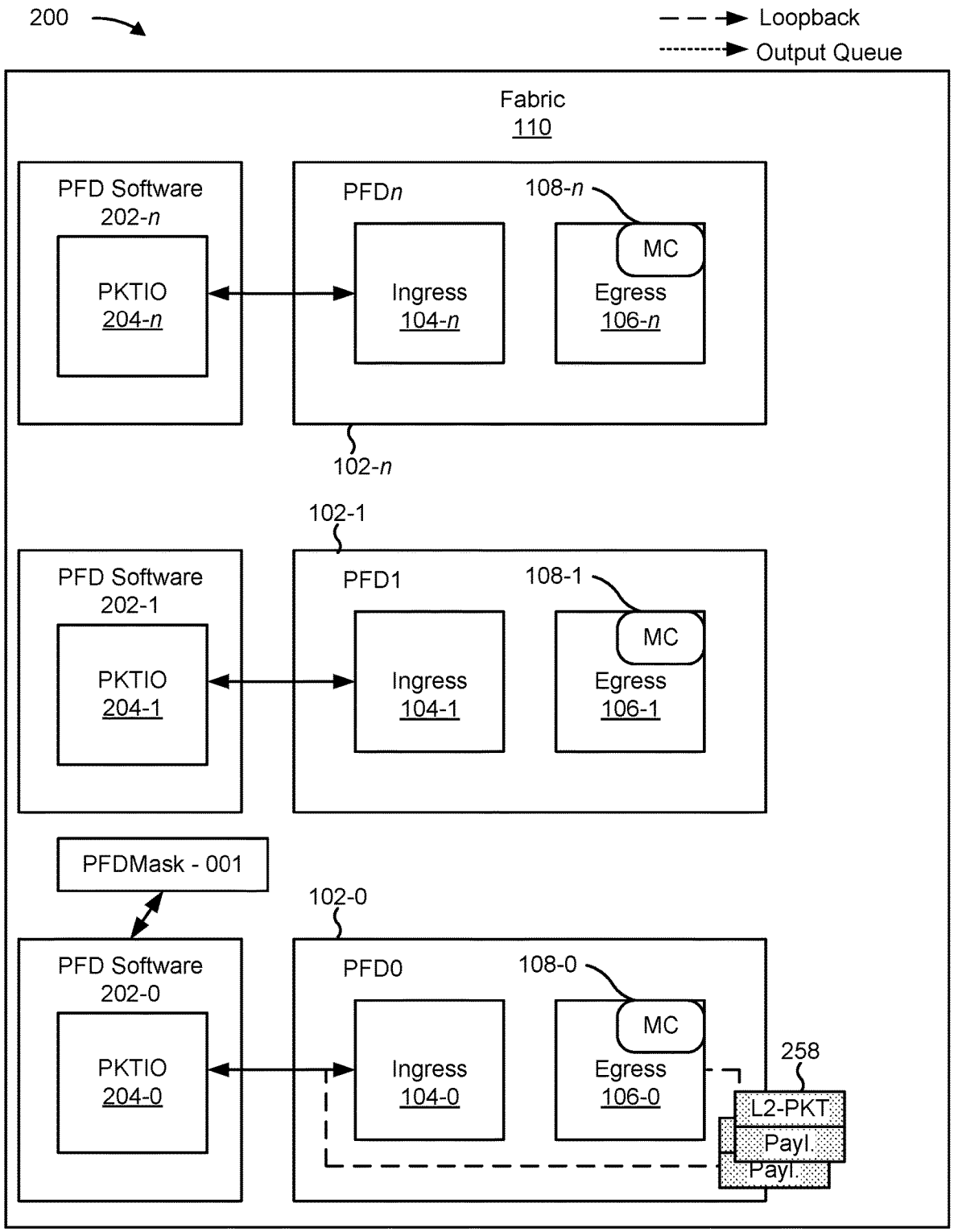
Figure 2P:
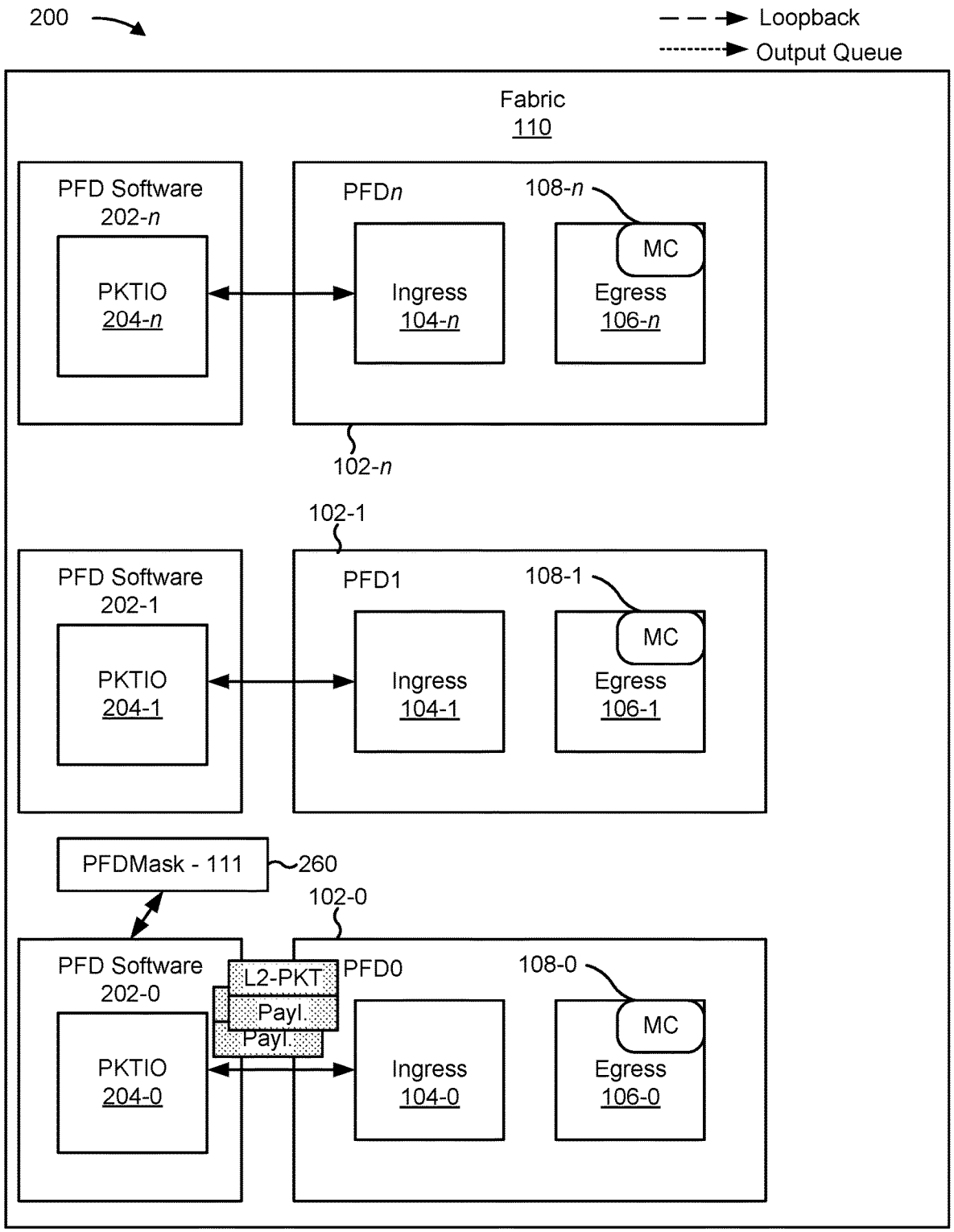
Figure 2Q:
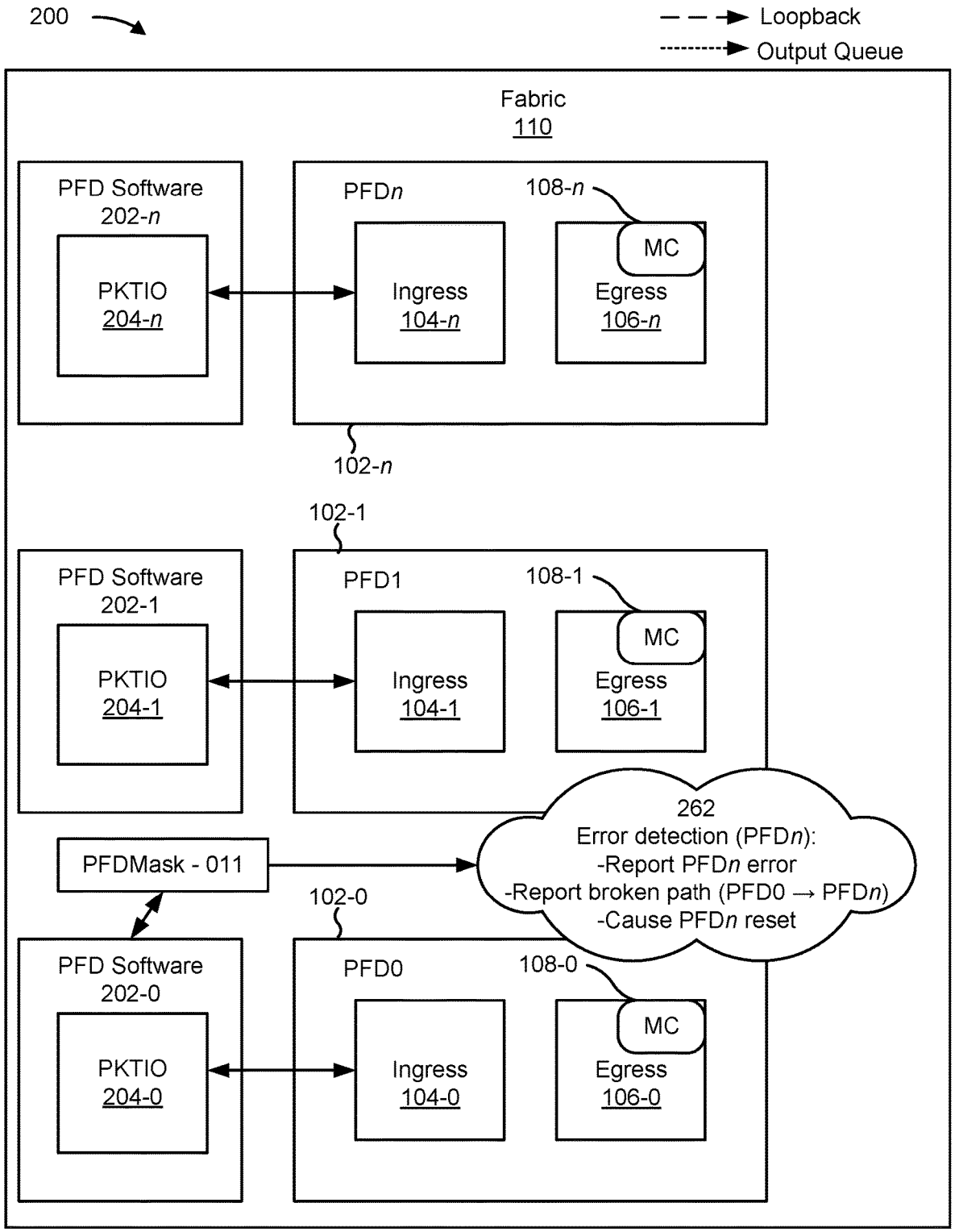

FIGS. 2A-2Q are diagrams of an example PFD system 200 associated with multicast liveness detection. As shown in FIGS. 2A-2Q, the PFD system 200 includes the multiple (e.g., N) PFDs 102 described above in connection with FIGS. 1A-1C (e.g., the first PFD 102-0 through the N-th PFD 102-*n*), which may be operatively connected to each other via the fabric 110. Moreover, in some implementations, each PFD 102 may be associated with an ASIC chip or chipset and/or may otherwise be a fixed-pipeline PFD 102 and/or associated with a fixed-pipeline platform. In that regard, the PFD system 200 may be associated with a fixed-pipeline architecture and/or may be referred to as a fixed-pipeline PFD system.

In some implementations, each PFD 102 may be associated with a PFD software component 202 (shown in FIGS. 2A-2Q as a first PFD software component 202-0 through an N-th PFD software component 202-*n*). Each PFD software component 202 may be capable of controlling operations of a respective PFD 102, such as by injecting packets at a respective ingress component 104, building multicast forwarding trees for use by one or more components of the respective PFD 102, or the like. In some implementations, each PFD software component 202 may be associated with a respective packet input/output (PKTIO) component 204 (shown in FIGS. 2A-2Q as a first PKTIO component 204-0 through an N-th PKTIO component 204-*n*). A PKTIO component 204 may be capable of injecting a packet into a respective PFD 102 (e.g., injecting a packet into a respective ingress component 104 of a PFD 102), extracting a packet from a respective PFD 102 (e.g., extracting a packet from a respective local path and/or loopback of a PFD 102), and/or performing similar operations. Put another way, a PKTIO component 204 may be associated with a host CPU of a line card or a similar device associated with the respective PFD 102 that is configured to inject and extract packets (e.g., ASIC packets) from the respective PFD 102. These devices and components are described in more detail below in connection with FIGS. 3-5.

As shown in FIG. 2B, and as indicated by reference number 206, the first PFD 102-0 (which, in this example, may be referred to as a source PFD and/or an ingress PFD) may inject a probe packet (sometimes referred to herein as a request packet) at the first PFD 102-0, and, more particularly, at the ingress component 104-0 of the first PFD 102-0. In some other implementations, a different component and/or or device may inject the probe packet at the first PFD 102-0. For example, in some implementations, packet injection may be offloaded to another device or component associated with the first PFD 102-0, such as a transmission control protocol/internet protocol (TCP/IP) offload engine (TOE), which may reduce PFD software involvement and/or achieve higher granularity of keepalives (e.g., approximately 100 milliseconds). In that regard, in the step shown in the connection with reference number 206, the first PFD 102-0 may obtain the probe packet from the PFD software component 202-0 (e.g., the PKTIO component 204-0 of the PFD software component 202-0), from a TOE, or from a similar device or component, at the ingress component 104-0 of the first PFD 102-0.

As shown in FIG. 2C, in some implementations, the probe packet may be an L2 packet including one or more fields indicating certain information associated with the probe packet. For example, the probe packet may include an L2 header field, shown as "L2-HDR" in FIG. 2C. Additionally, or alternatively, the probe packet may include a field indicating a type of packet, such as whether the packet is a request packet (e.g., a probe packet), or whether the packet is a response packet transmitted by a PFD 102 in response to receiving a request packet from another PFD 102, which is described in more detail below. Additionally, or alternatively, the probe packet may include a field indicating a source identifier associated with the packet (shown as "SRC ID"), which may be an identifier associated with the source PFD 102 (in this example, the first PFD 102-0). Additionally, or alternatively, the probe packet may include a field indicating a destination identifier associated with the packet (shown as "DST ID"), which may be an identifier associated with one or more destination PFDs 102 (in this example, the second PFD 102-1 through the N-th PFD 102-n, which is described in more detail below in connection with FIGS. 2D-2I). In some implementations, the destination identifier may be an identifier associated with a group of PFDs 102 that include all the PFDs 102 in the PFD system 200 (e.g., the first PFD 102-0 through the N-th PFD 102-n). Additionally, or alternatively, the probe packet may include a field indicating a sequence number associated with the packet and/or a field indicating a time stamp associated with the packet, which may be used by the source PFD 102 (e.g., the first PFD 102-0 in this example) to perform bookkeeping tasks, such as to identify if one or more response packets are not received in response to injecting a certain probe packet, which may indicate connectivity issues with one or more remote PFDs 102, as described in more detail below.

As shown in FIG. 2D, and as indicated by reference number 210, the first PFD 102-0 may forward the probe packet to the multicast component 108-0 associated with the first PFD 102-0. In some implementations, the probe packet may be associated with (e.g., may include programming for) a broadcast next-hop, which is a next-hop associated with locally replicating the probe packet to the first PFD 102-0 as well as replicating the probe packet to each remote PFD 102 in the PFD system 200. More particularly, as shown using cross-hatching in FIG. 2D, the broadcast next-hop may be associated with the multicast component 108-0 replicating the probe packet one time for the local PFD 102 (e.g., the first PFD 102-0 in this example) and one time for each remote PFD 102 (e.g., each PFD 102 included in a remote replication list, which may include PFDs 102-1 through 102-n in this example). For example, in a 64-PFD system, the remote replication list may include 63 entries such that, in addition to the local replication copy, the multicast component replicates the probe packet 63 times corresponding to the 63 remote PFDs 102.

In some implementations, the probe packet may also be associated with a local next-hop, which may be a next-hop associated with a multicast component 108 locally replicating the probe packet one time for a local PFD 102 but which includes no fabric replications, which is shown without cross-hatching in FIG. 2D to indicate that the multicast component 108-0 is not utilizing the local next-hop at this point in time. In some implementations, the probe packet and/or the multicast components 108 may be configured such that a multicast component 108 that first receives the probe packet (e.g., the multicast component 108 of the source PFD 102, which is the multicast component 108-0 associated with the first PFD 102-0 in the example shown in FIG. 2D) replicates the probe packet according to the broadcast next-hop (e.g., by creating one local copy of the probe packet and one copy for each remote PFD 102), and such that multicast components 108 that receive replicated copies of the probe packet (e.g., copies created by source PFD 102's multicast component 108) replicate the probe packet according to the local next-hop (e.g., by creating only one local copy of the probe packet).

In that regard, in some implementations, a same next-hop is programmed on all PFDs 102 in the PFD system 200 using a global fabric token, with programming varying slightly at various PFDs 102. For example, a multicast component 108 of a source PFD 102 may create fabric replications to all remote PFDs 102 (e.g., all PFDs 102 associated with a remote VOQ) in the PFD system 200, and the multicast component 108 of the source PFD 120 may create a local replication to a host CPU (e.g., a CPU associated with a local VOQ) in the PFD system 200 in order to test the local PFD 120's path. Prior to fabric replication (e.g., prior to replicating the probe packet for each remote PFD 102), the multicast component 108 may alter the fabric token (sometimes referred to as creating a global fabric token+1), such as for a purpose of differentiating a probe packet coming from a remote PFD 102 from a probe packet coming from a local PFD 102 (e.g., a probe packet injected by a PKTIO component 204 associated with local PFD 102). The global fabric token+1 may be associated with single replication (e.g., may be associated with the local next-hop described above) to the PFD 102's own CPU (e.g., LCPU).

In that regard, in the operations shown in connection with reference number 212, the first PFD 102-0 (more particularly, the multicast component 108-0 of the first PFD 102-0) may replicate the probe packet forming multiple copies of the probe packet. Here, because the local PFD 102-0 is configured to replicate the probe packet according to the broadcast next-hop described above (e.g., because the multicast component 108 received an original copy of the probe packet and not a replicated copy of the probe packet), the multicast component 108-0 may replicate the probe packet one time for the local PFD 102 (e.g., the first PFD 102-0) as well as one time for each remote PFD 102 in the PFD system 200 (e.g., PFDs 102-1 through PFD 102-n), as indicated using cross-hatching in connection with the broadcast next-hop depicted in FIG. 2D.

As shown by FIG. 2E, the replicated copies of the probe packet may be transmitted to an ingress component 104-0 of the first PFD 104-0 for forwarding to the remote PFDs 102 associated with the PFD system. More particularly, as indicated by reference number 214, the multiple copies of the probe packet (e.g., one for each PFD 102 of the PFD system 200) may be transmitted from the multicast component 108-0 of the first PFD 102-0 to the ingress component 104-0 of the first PFD 102-0, such as via a loopback or similar local path associated with the first PFD 102-0.

As shown in FIG. 2F, and as indicated by reference number 216, the PFD software component 202-0 associated with the first PFD 102-0 (more particularly, the PKTIO component 204-0 associated with the PFD software component 202-0) may extract the local replicated copy of the probe packet from the loopback or other local path associated with the first PFD 102-0. More particularly, in some implementations, the first PFD 102-0 (e.g., the PKTIO component 204-0 associated with the first PFD 102-0) may receive a first copy of the probe packet that originates at the first PFD 102-0 (e.g., a multicast component 108-0 associated with the first PFD 102-0). Successful reception of the local copy of the probe packet may be indicative that the multicast component 108-0 associated with the first PFD 102-0 is operable and/or that there are no connectivity issues associated with an output queue (e.g., VOQ) associated with the multicast component 108-0 of the first PFD 102-0 and/or a loopback associated with the first PFD 102-0.

In some implementations, the PFD software component 202-0 associated with the first PFD 202-0 (or else another device and/or component associated with the first PFD 102-0, such as a TOE or similar component or device) may perform a bookkeeping of successfully received probe packets and/or response packets (described in more detail below).

For example, the PFD software component 202-0 associated with the first PFD 202-0 may maintain a PFD mask (shown in FIG. 2F as "PFDmask"), which may be a bit map including a bit associated with each PFD 102 of the PFD system 200. Upon successful reception of a copy of a probe packet from the first PFD 102-0 and/or upon successful reception of a response packet from other PFDs 102 of the PFD system 200 (described in more detail below), the PFD software component 202-0 associated with the first PFD 202-0 may set a bit of the PFD mask that corresponds to the PFD 102 from which the respective packet was received to bit "1." For example, in the example shown in FIG. 2F, the PFD mask may include N bits, one for each PFD of the system (e.g., in the depicted example, three bits, one for each of the first PFD 102-0, the second PFD 102-1, and the N-th PFD 102-n). Accordingly, upon successful extraction of the copy of the probe packet from the loopback associated with first PFD 102-0, the PFD software component 202-0 associated with the first PFD 202-0 may set a bit corresponding to the first PFD 102-0 (e.g., a last and/or rightmost bit in the example shown in FIG. 2F) to "1," which may be indicative that the multicast component 108-0 of the first PFD 102-0 is performing as it should and/or that there is no connectivity problem with the first PFD 102-0.

As shown in FIG. 2G, the remaining replicated probe packets may be transmitted to each remote PFD 102 in the PFD system 200, and, more particularly, to multicast components 108 associated with each remote PFD 102 in the PFD system 200, via respective output queues (e.g., VOQs). More particularly, as indicated by reference numbers 218 and 220, the ingress component 104-0 of the first PFD 102-0 may transmit copies of the probe packet to the multicast components 108 of the second PFD 102-1 through the N-th PFD 102-n via respective output queues (e.g., respective VOQs). For example, the ingress component 104-0 of the first PFD 102-0 (e.g., the source PFD 102) may transmit a first replicated probe packet via a first output queue (e.g., an output queue associated with the second PFD 102-1, and, more particularly, an output queue associated with the multicast component 108-1 associated with the second PFD 102-1), and so forth for each PFD 102 in the system (e.g., through the N-th PFD 102-n).

As shown by FIG. 2H, when the copies of the probe packet reach the respective multicast components 108, the multicast components 108 may be configured to replicate the copies of the probe packet in a way associated with the local next-hop described above in connection with FIG. 2D, and as shown in FIG. 2H by using cross hatching. More particularly, each multicast component 108 of each remote PFD 102 may replicate the probe packet a single time for transmission to a host CPU (e.g., an LCPU) via a respective loopback. For example, as indicated by reference number 222, the multicast component 108-1 of the second PFD 102-1 may replicate the probe packet once, associated with local replication for use by the PFD software component 202-1 associated with the second PFD 102-1. Similarly, as indicated by reference number 224, the multicast component 108-n of the N-th PFD 102-n may replicate the probe packet once, associated with local replication for use by the PFD software component 202-n associated with the N-th PFD 102-n. Moreover, as shown in FIG. 2I, each of the remote PFDs 102 may transmit a replicated copy of the probe packet to a local CPU (e.g., to a PFD software component 202 of the respective PFD 102) via a loopback or other local path. More particularly, as shown by reference number 230, the second PFD 102-1 may transmit a replicated copy of the probe packet towards an ingress component 104-1 of the second PFD 102-1 via a loopback associated with the second PFD 102-1, and, as shown by reference number 232, the N-th PFD 102-n may transmit a replicated copy of the probe packet towards an ingress component 104-n of the N-th PFD 102-n via a loopback associated with the N-th PFD 102-n.

As shown by FIG. 2J, the PFD software components 202 associated with the remote PFDs 102 (more particularly, the PKTIO components 204 associated with the PFD software components 202) may be configured to extract the local replicated copies of the probe packet from a respective loopback, in a similar manner as described above in connection with FIG. 2F. More particularly, as shown by reference number 236, the PKTIO component 204-1 associated with the second PFD 102-1 may be configured to extract the replicated packet from the loopback associated with the second PFD 102-1, and, similarly, as shown by reference number 238, the PKTIO component 204-n associated with the N-th PFD 102-n may be configured to extract the replicated packet from the loopback associated with the N-th PFD 102-n.

As shown by FIG. 2K, upon successfully receiving the replicated copies of the probe packet, the PKTIO component 204 and/or the PFD software component 202 of each remote PFD 102 may identify a source PFD 102 associated with the probe packet (e.g., via header information encoded into the probe packet or the like) and prepare a response packet to be transmitted to the source PFD 102. More particularly, as shown by reference number 242, based on receiving the replicated probe packet, the PFD software component 202-1 of the second PFD 102-1 may create a response packet to be transmitted to the first PFD 102-0 (e.g., the source PFD 102 indicated by the probe packet). Similarly, as shown by reference number 246, based on receiving the replicated probe packet, the PFD software component 202-n of the N-th PFD 102-n may create a response packet to be transmitted to the first PFD 102-0. In some implementations, the response packet may include similar information as the probe packet described in connection with reference number 208 in FIG. 2C, but may include an indication that the packet is a response packet rather than a request packet (such as via the request/response field described above in connection with FIG. 2C). In that regard, the global fabric token+1 received at the remote PFDs 102 may again be changed (and thus may sometimes be referred to as a global fabric token+2) in order to indicate that the packet is a response packet and not a request packet. Moreover, the PFD software component 202 of each remote PFD 102 may set a destination identifier field or similar field to an output queue (e.g., a VOQ) associated with the source PFD 102 (e.g., the first PFD 102-0 in this example).

As shown by FIG. 2L, the PFD software component 202 of each remote PFD 102 (more particularly, the PKTIO component 204 of each remote PFD 102) may inject the response packets into the respective PFDs 102. More particularly, as shown by reference number 248, the PKTIO component 204-1 associated with the second PFD 102-1 may inject a response packet at the ingress component 104-1 of the second PFD 102-1. Similarly, as shown by reference number 250, the PKTIO component 204-n associated with the N-th PFD 102-n may inject a response packet at the ingress component 104-n of the N-th PFD 102-n.

As shown by FIG. 2M, each PFD 102 may then transmit a respective response packet to the source PFD 102 (e.g., the first PFD 102-0 in this example), such as via respective output queues (e.g., VOQs) associated with the multicast component 108-0 of the first PFD 102-0. More particularly, as shown by reference number 252, the ingress component 104-1 of the second PFD 102-1 may transmit the response packet to the multicast component 108-0 of the first PFD 102-0 (e.g., the source PFD 102). Similarly, as shown by reference number 254, the ingress component 104-n of the N-th PFD 102-n may transmit the response packet to the multicast component 108-0 of the first PFD 102-0.

As shown by FIG. 2N, and as indicated by reference number 256, when the response packets reach the first multicast component 108-0 (e.g., the multicast component 108 associated with the source PFD 102), the multicast component 108-0 may be configured to replicate the response packets in a way associated with the local next-hop described above in connection with FIG. 2D, and as shown in FIG. 2N by using cross hatching. More particularly, the multicast component 108-0 of the first PFD 102-0 (e.g., the source PFD 102) may replicate each response packet a single time for transmission to a host CPU (e.g., PFD software 202-0 associated with the first PFD 102-0) via a loopback. Moreover, as shown in FIG. 2O, and as indicated by reference number 258, the first PFD 102-0 (e.g., the source PFD 102) may transmit a replicated copy of each response packet to a local CPU (e.g., the PFD software component 202-0 of the first PFD 102-0) via a loopback or other local path.

As shown by FIG. 2P, the PFD software component 202-0 associated with the first PFD 102-0 (more particularly, the PKTIO component 204-0 associated with the PFD software component 202-0) may be configured to extract the replicated response packets from the loopback associated with the first PFD 102-0. Successful reception of a response packet may be indicative that a multicast component 108 associated with the PFD 102 from which the response packet is received is operable and/or that there are no connectivity issues associated with an output queue (e.g., VOQ) associated with the multicast component 108 of the respective PFD 102 and/or a loopback associated with the respective PFD 102. Put another way, the PFD software component 202-0 associated with the first PFD 102-0 may be able to determine a liveness and/or reachability of a remote PFD 102 based on whether a response packet is successfully received from the remote PFD 102.

Moreover, as described above in connection with FIG. 2F, in some implementations the PFD software component 202-0 associated with the first PFD 202-0 (or else another device and/or component associated with the first PFD 102-0, such as a TOE or similar component or device) may perform a bookkeeping of successfully received probe packets and/or response packets, such as by maintaining the PFD mask described above. Accordingly, upon successful reception of a response packet from a remote PFD 102, the PFD software component 202-0 associated with the first PFD 202-0 may set a bit of the PFD mask that corresponds to the PFD 102 from which the respective packet was received to bit "1." For example, as indicated by reference number 260, upon successful extraction of the copy of the probe packets from the loopback associated with first PFD 102-0, the PFD software component 202-0 associated with the first PFD 202-0 may set a bit corresponding to the second PFD 102-1 (e.g., a second bit in the example shown in FIG. 2P) and a bit corresponding to the N-th PFD 102-n (e.g., a first, or leftmost, bit in the example shown in FIG. 2P) to "1," which may be indicative that the multicast components 108 of the remote PFDs are performing as they should and/or that there is no connectivity problem with respect to the remote PFDs 102.

In some other implementations, if a response packet associated with a remote PFD 102 is not timely received, the first PFD 102-0 (e.g., the PFD software component 204-0 of the first PFD 102-0) may determine that the remote PFD 102 is not reachable from the source PFD 102. Put another way, a source PFD 102 may determine that any PFD 102 for which a bit of the PFD mask is set to "0" after a certain time period in unreachable, and thus the source PFD 102 may sound an alarm or perform some other action. For example, FIG. 2Q shows an alternative implementation in which the PFD mask includes a "0" bit after a certain time period (e.g., a time threshold), which may be indicative that a certain PFD 102 (in the example shown, the N-th PFD 102-n) is unreachable. Put another way, the PFD mask including the "0" bit after the certain time period (e.g., time threshold) may mean that the source PFD 102 did not receive a response packet from the corresponding remote PFD 102. Accordingly, as shown by reference number 262, the PFD software component 202-0 associated with the first PFD 102-0 (e.g., the source PFD 102 in this example) may take some action based on determining that the remote PFD 102 is unreachable. For example, the PFD software component 202-0 associated with the first PFD 102-0 may report an error for the N-th PFD 102-n, may report a broken path for the N-th PFD 102-n (e.g., may report that a path between the first PFD 102-0 and the N-th PFD 102-n is broken), may cause the N-th PFD 102-n to be reset, or may take some other action.

In some implementations, the PFD system 200 may include a first number of PFDs 102 (e.g., N in the example described in connection with FIGS. 2A-2Q), and the source PFD 102 (e.g., the first PFD 102-0 in the example described in connection with FIGS. 2A-2Q) may receive a second number (e.g., M) of packets in response to injecting the probe packet at the first PFD 102-0 (e.g., a sum any local replicated copies of the probe packet and replicated response packets extracted from the loopback may be equal to a second number, M). In such implementations, the source PFD 102 may initiate an alarm when the second number is less than the first number (e.g., when M<N), may identify at least one PFD 102 for which a packet was not received when the second number is less than the first number (e.g., when M<N), may cause at least one PFD 102 for which a response packet was not received to be reset when the second number is less than the first number (e.g., when M<N), and/or may perform a similar action in order to remedy any detected connectivity issues when the second number is less than the first number (e.g., when M<N).

In some implementations, each of the PFDs 102 of the PFD system 200 may be configured to periodically inject a probe packet into a respective PFD 102 (e.g., into a respective ingress component 104 of a respective PFD 102) in order to test a reachability and/or liveness of each other PFD 102 with respect to the source PFD 102. Put another way, each PFD 102 of the PFD system 200 may be configured to serve as a source PFD 102 and thus perform operations that are substantially similar to the operations described in connection with the first PFD 102-0 in connection with FIGS. 2A-2Q, thereby simultaneously testing the reachability of remote PFDs 102 in the PFD system 200 from each respective PFD 102.

Additionally, or alternatively, in some implementations, one or more operations described above may be omitted when each PFD 102 is configured to inject a respective probe packet into a respective PFD 102 in the PFD system 200. For example, in implementations in which each PFD 102 is configured to inject a respective probe packet, the response packets may be avoided altogether, and, instead, when a PFD software component 202 of a PFD 102 receives a request packet (e.g., a probe packet) from a remote PFD 102, the PFD software component 202 may implicitly treat the request packet as a response from the remote PFD 102 (e.g., the PFD software component 202 may determine that there is no connectivity issues with respect to a remote PFD 102 based on receiving a request packet from the remote PFD 102, and/or may set a bit of a PFD mask that is associated with a remote PFD 102 to "1" based at least in part on receiving the request packet). In some implementations, this may reduce computing resource consumption, such as by reducing the usage of one fabric token.

Based on a PFD 102 and/or a PFD system 200 determining a liveness of one or more links using a probe packet that is replicated by one or more multicast components 108 as described above, a resiliency of a multicast framework may be monitored with relatively little resource consumption, such as by consuming only two to three fabric tokens (e.g., F-labels) regardless of a total number of PFDs 120 (e.g., N) in the PFD system 200. Moreover, the implementations described above in connection with FIGS. 2A-2Q may serve to test an operability of multiple components of local and remote PFDs 102, such as the ingress component 104, the egress component 106, and the multicast component 108. Additionally, the implementations described above may be flexibly implemented regardless of a type of multicast tree or a type of multicast replication used in a given platform. Similarly, the implementations described above may be used more generally for remote PFD 102 liveness detection, because the implementations do not follow a multicast tree and/or are not based on a specific multicast application. Moreover, by injecting a probe packet at each PFD 102 (e.g., at each line card) of a PFD system 200, each PFD 102 may determine a multicast liveness to other PFDs 120 in the PFD system 200 without a need for a centralized entity. Additionally, the implementations described above may be flexibly implemented regardless of system architecture, and thus may be implemented across both fixed-pipeline and flexible-pipeline architectures.

As indicated above, FIGS. 2A-2Q are provided as an example. Other examples may differ from what is described with regard to FIGS. 2A-2Q. The number and arrangement of devices shown in FIGS. 2A-2Q are provided as an example. In practice, there may be additional devices, fewer devices, different devices, or differently arranged devices than those shown in FIGS. 2A-2Q. Furthermore, two or more devices shown in FIGS. 2A-2Q may be implemented within a single device, or a single device shown in FIGS. 2A-2Q may be implemented as multiple, distributed devices. Additionally, or alternatively, a set of devices (e.g., one or more devices) shown in FIGS. 2A-2Q may perform one or more functions described as being performed by another set of devices shown in FIGS. 2A-2Q.

Figure 3:
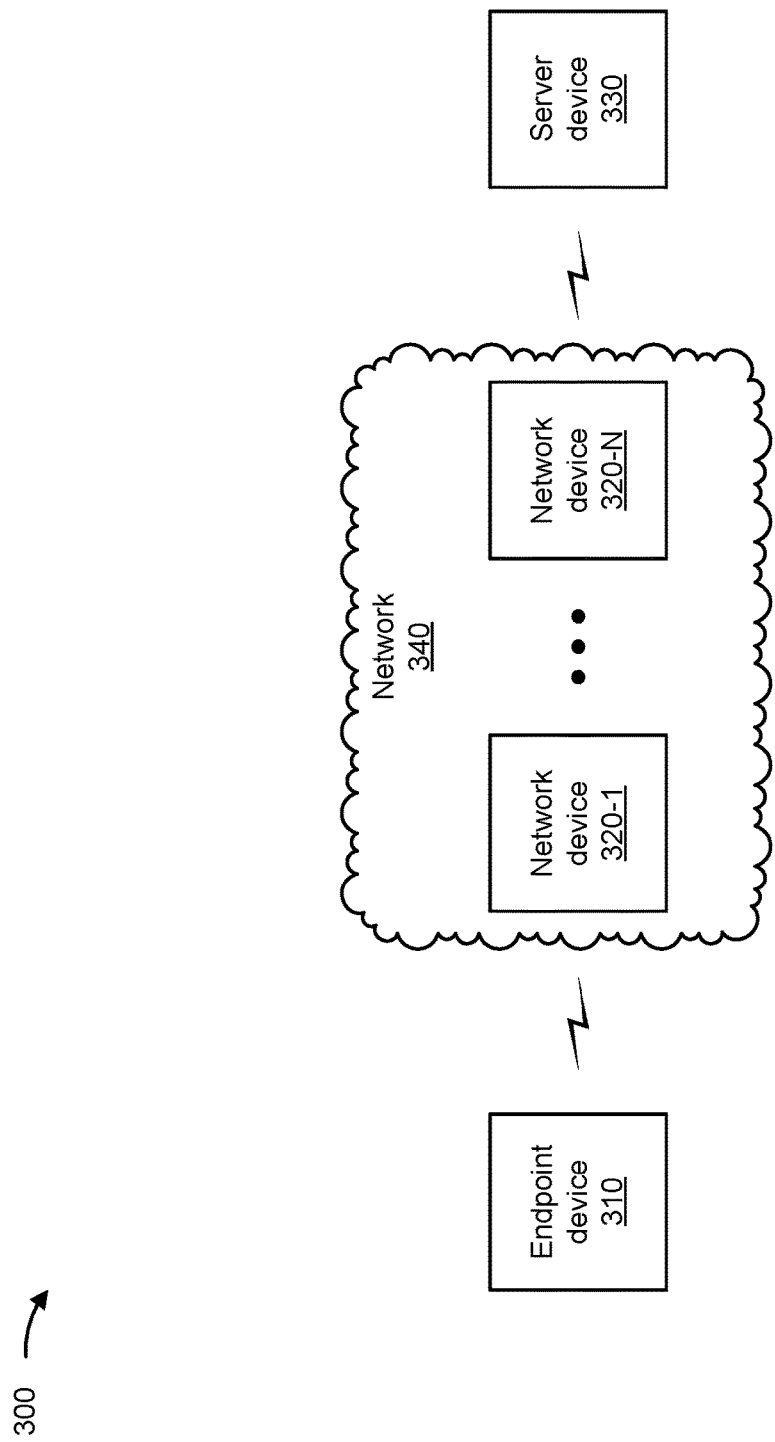
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an endpoint device 310, a group of network devices 320 (shown as network device 320-1 through network device 320-N), a server device 330, and a network 340. Devices of environment 300 may interconnect via wired connections, wireless connections, or a combination of wired and wireless connections.

Endpoint device 310 includes one or more devices capable of receiving, generating, storing, processing, and/or providing information, such as information described herein. For example, endpoint device 310 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 310 may receive network traffic from and/or may provide network traffic to other endpoint devices 310 and/or server device 330, via network 340 (e.g., by routing packets using network devices 320 as intermediaries).

Network device 320 includes one or more devices capable of receiving, processing, storing, routing, and/or providing traffic (e.g., a packet or other information or metadata) in a manner described herein. For example, network device 320 may include a router, such as a label switching router (LSR), a label edge router (LER), an ingress router, an egress router, a provider router (e.g., a provider edge router or a provider core router), a virtual router, or another type of router. Additionally, or alternatively, network device 320 may include a gateway, a switch, a firewall, a hub, a bridge, a reverse proxy, a server (e.g., a proxy server, a cloud server, or a data center server), a load balancer, and/or a similar device. In some implementations, network device 320 may be a physical device implemented within a housing, such as a chassis. In some implementations, network device 320 may be a virtual device implemented by one or more computer devices of a cloud computing environment or a data center. In some implementations, a group of network devices 320 may be a group of data center nodes that are used to route traffic flow through network 340. In some implementations, one or more of the PFDs 102 described herein may correspond to a network device 320.

Server device 330 includes one or more devices capable of receiving, generating, storing, processing, and/or providing information, such as information described herein. For example, server device 330 may include a laptop computer, a tablet computer, a desktop computer, a group of server devices, or a similar type of device, associated with multicast traffic. In some implementations, server device 330 may receive information from and/or transmit information (e.g., multicast traffic) to endpoint device 310, via network 340 (e.g., by routing packets using network devices 320 as intermediaries).

Network 340 includes one or more wired and/or wireless networks. For example, network 340 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a WAN, a metropolitan area network (MAN), a telephone network (e.g., the Public Switched Telephone Network (PSTN))), a private network, an ad hoc network, an intranet, the Internet, a fiber optic-based network, a cloud computing network, or the like, and/or a combination of these or other types of networks. In some implementations, the fabric 110 described herein may be associated with the network 340.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
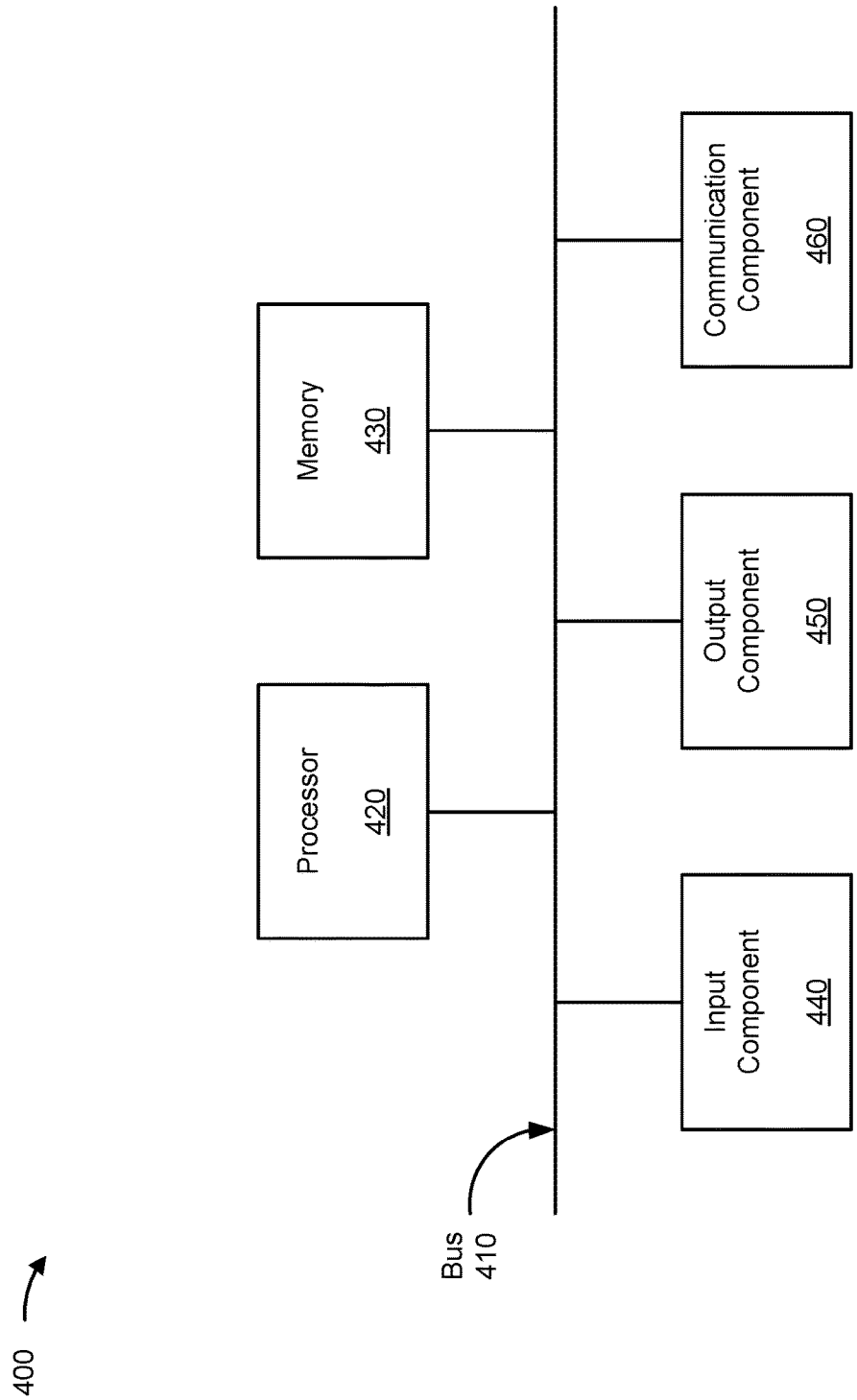
FIG. 4 is a diagram of example components of a device associated with multicast liveness detection.

FIG. 4 is a diagram of example components of a device 400 associated with multicast liveness detection. The device 400 may correspond to a PFD 102 and/or a component thereof (e.g., an ingress component 104, an egress component 106, a multicast component 108, a PFD software component 202, and/or a PKTIO component 204), an endpoint device, a network device 320, and/or a server device 330. In some implementations, a PFD 102 and/or a component thereof, an endpoint device 310, a network device 320, and/or a server device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
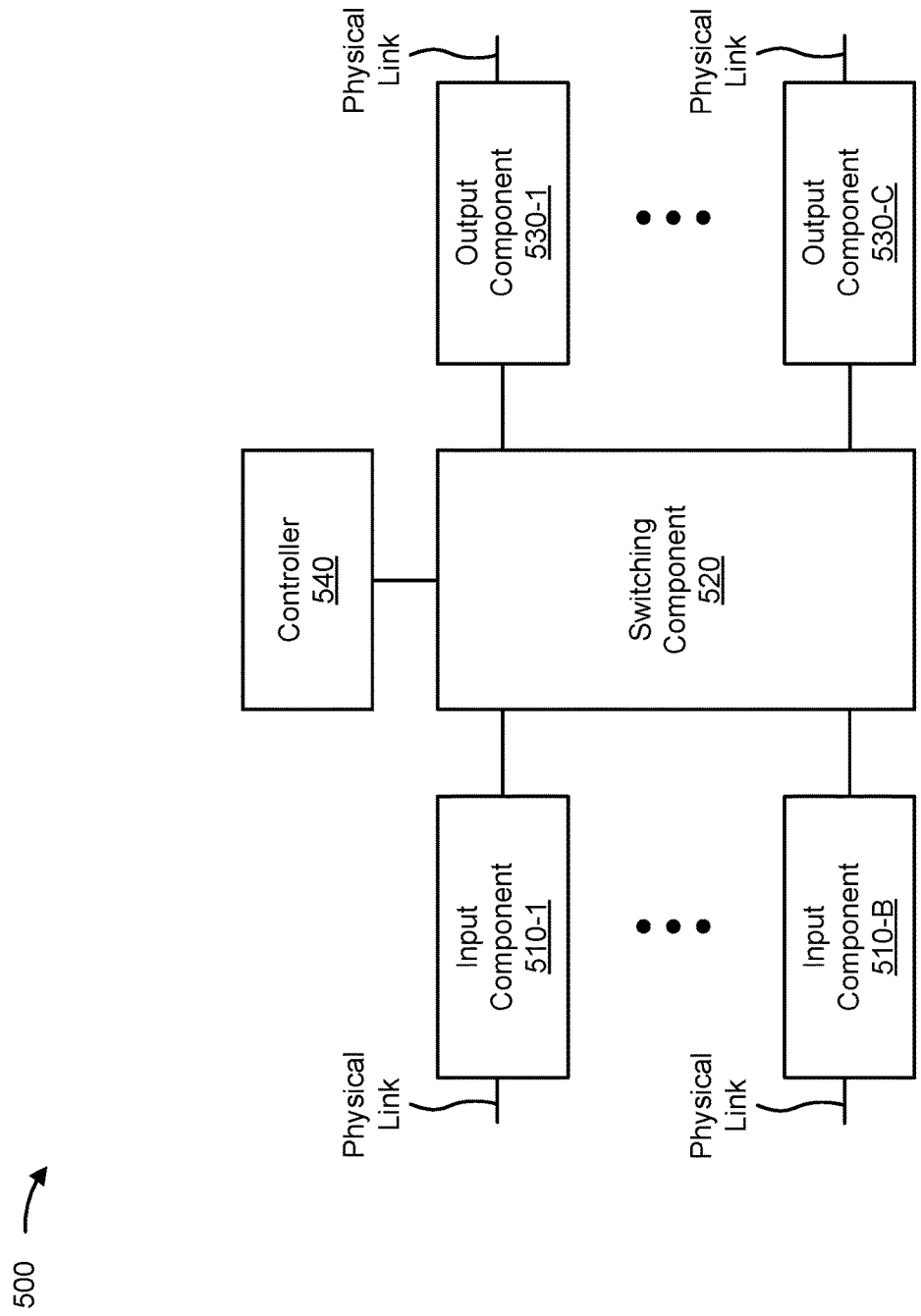
FIG. 5 is another diagram of example components of a device associated with multicast liveness detection.

FIG. 5 is a diagram of example components of a device 500 associated with multicast liveness detection. Device 500 may correspond to a PFD 102 and/or a network device 320. In some implementations, a PFD 102 and/or a network device 320 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
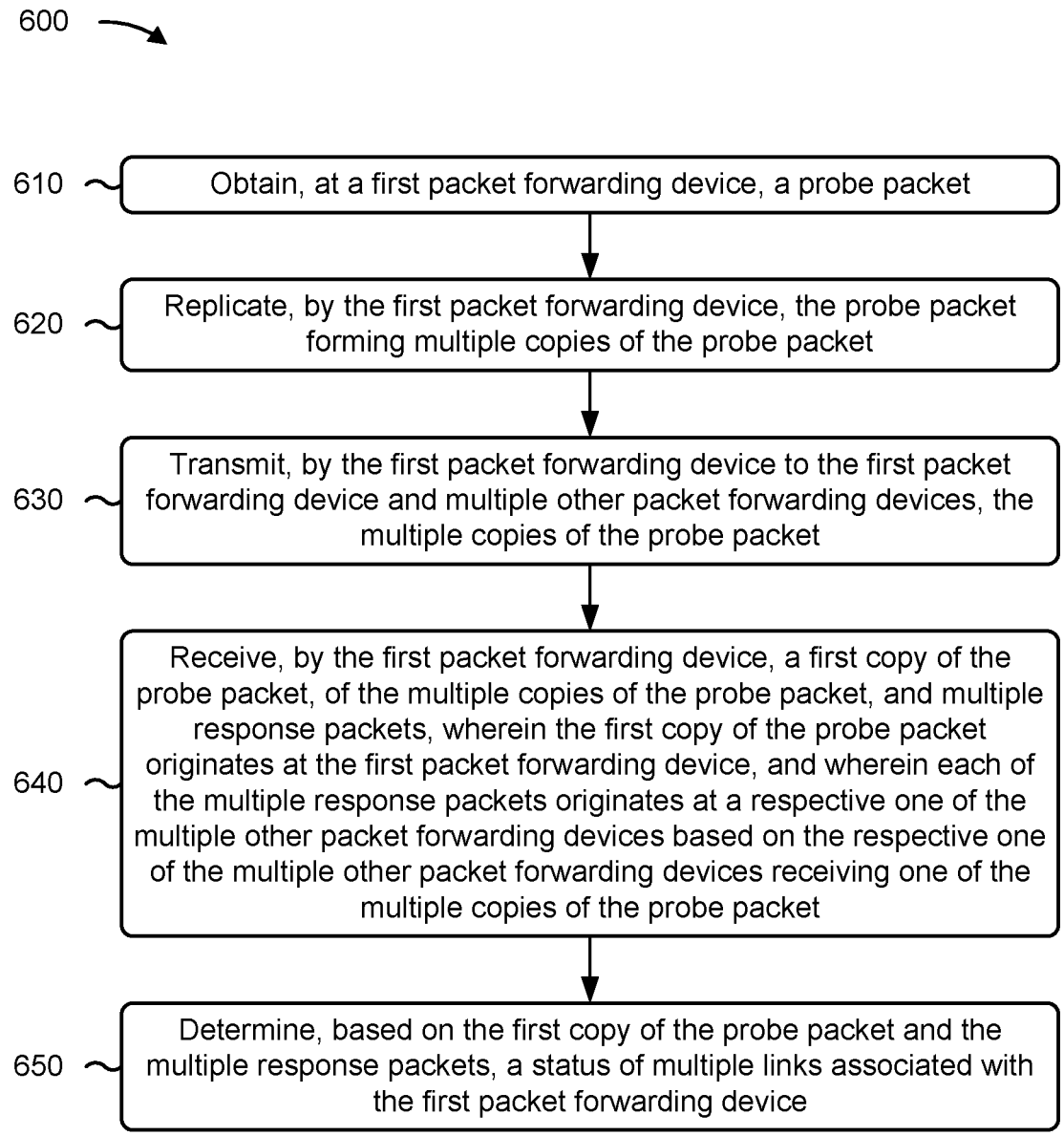
FIG. 6 is a flowchart of an example process associated with multicast liveness detection.

FIG. 6 is a flowchart of an example process 600 associated with multicast liveness detection. In some implementations, one or more process blocks of FIG. 6 are performed by a first packet forwarding device (e.g., first PFD 102-0 or other source PFD 102). In some implementations, one or more process blocks of FIG. 6 are performed by another device or a group of devices separate from or including the first packet forwarding device, such as another packet forwarding device (e.g., PFD 102-1, PFD 102-n), a system of packet forwarding devices (e.g., PFD system 200), a network device (e.g., network device 320), a routing device (e.g., device 500), or a similar device. Additionally, or alternatively, one or more process blocks of FIG. 6 may be performed by one or more components of device 400, such as processor 420, memory 430, input component 440, output component 450, and/or communication component 460, and/or one or more components of device 500, such as input component 510, switching component 520, output component 530, and/or controller 540.

As shown in FIG. 6, process 600 may include obtaining, at a first packet forwarding device, a probe packet (block 610). For example, the first packet forwarding device may obtain the probe packet, as described above.

As further shown in FIG. 6, process 600 may include replicating the probe packet forming multiple copies of the probe packet (block 620). For example, the first packet forwarding device may replicate the probe packet forming multiple copies of the probe packet, as described above.

As further shown in FIG. 6, process 600 may include transmitting, to the first packet forwarding device and multiple other packet forwarding devices, the multiple copies of the probe packet (block 630). For example, the first packet forwarding device may transmit, to the first packet forwarding device and multiple other packet forwarding devices, the multiple copies of the probe packet, as described above.

As further shown in FIG. 6, process 600 may include receiving a first copy of the probe packet, of the multiple copies of the probe packet, and multiple response packets (block 640). For example, the first packet forwarding device may receive a first copy of the probe packet, of the multiple copies of the probe packet, and multiple response packets, as described above. In some implementations, the first copy of the probe packet originates at the packet forwarding device. In some implementations, each of the multiple response packets originates at a respective one of the multiple other packet forwarding devices based on the respective one of the multiple other packet forwarding devices receiving one of the multiple copies of the probe packet.

As further shown in FIG. 6, process 600 may include determining, based on the first copy of the probe packet and the multiple response packets, a status of multiple links associated with the first packet forwarding device (block 650). For example, the first packet forwarding device may determine, based on the first copy of the probe packet and the multiple response packets, a status of multiple links associated with the first packet forwarding device, as described above.

Process 600 may include additional implementations, such as any single implementation or any combination of implementations described below and/or in connection with one or more other processes described elsewhere herein.

In a first implementation, the multiple links are associated with multiple output queues, and each output queue, of the multiple output queues, is associated with one of the first packet forwarding device or another packet forwarding device of the multiple other packet forwarding devices.

In a second implementation, alone or in combination with the first implementation, receiving the first copy of the probe packet and the multiple response packets includes receiving the first copy of the probe packet and the multiple response packets via a loopback associated with the first packet forwarding device.

In a third implementation, alone or in combination with one or more of the first and second implementations, obtaining the probe packet comprises obtaining the probe packet at an ingress component of the first packet forwarding device, and replicating the probe packet includes replicating the probe packet by a multicast replication component associated with an egress component of the first packet forwarding device.

In a fourth implementation, alone or in combination with one or more of the first through third implementations, a sum of the first packet forwarding device and the multiple other packet forwarding devices is equal to a first number of packet forwarding devices, a sum of the first copy of the probe packet and the multiple response packets is equal to a second number of packets, and the method further comprises initiating an alarm when the second number is less than the first number.

In a fifth implementation, alone or in combination with one or more of the first through fourth implementations, process 600 includes identifying at least one packet forwarding device, of the multiple other packet forwarding devices, for which a response packet was not received.

In a sixth implementation, alone or in combination with one or more of the first through fifth implementations, process 600 includes causing at least one packet forwarding device, of the multiple other packet forwarding devices, for which a response packet was not received to be reset.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by an ingress component of a first packet forwarding device, a probe packet associated with a multicast packet;
   transmitting, from the ingress component and through an egress component of the first packet forwarding device, the probe packet to a multicast replication component of the first packet forwarding device;
   replicating, by the multicast replication component associated with the egress component of the first packet forwarding device, the probe packet at least two times to form multiple copies of the probe packet,
      wherein a first replication generates a set of first copies of the probe packet, of the multiple copies of the probe packet, that is associated with a fabric replication of the probe packet, and
      wherein a second replication generates a set of second copies of the probe packet, of the multiple copies of the probe packet, that is associated with local replications, of the probe packet, that is associated with each wide area network (WAN) port on a local replication list, wherein the set of second copies egress via the WAN ports associated with the first packet forwarding device;

transmitting, by the first packet forwarding device to the first packet forwarding device the set of second copies of the probe packet;

transmitting, by the first packet forwarding device to multiple other packet forwarding devices, the set of first copies of the probe packet;

receiving, by the first packet forwarding device, the set of second copies of the probe packet, and multiple response packets, wherein each of the multiple response packets originates at a respective one of the multiple other packet forwarding devices based on a respective one of the multiple other packet forwarding devices receiving one of the set of first copies of the probe packet; and determining, based on the set of second copies of the probe packet and the multiple response packets, a status of multiple links associated with the first packet forwarding device.

2. The method of claim 1, wherein the multiple links are associated with multiple output queues, and wherein each output queue, of the multiple output queues, is associated with one of the first packet forwarding device or another packet forwarding device of the multiple other packet forwarding devices.

3. The method of claim 1, wherein receiving the set of second copies of the probe packet and the multiple response packets includes receiving the set of second copies of the probe packet and the multiple response packets via a loopback associated with the first packet forwarding device.

4. The method of claim 1, wherein a sum of the first packet forwarding device and the multiple other packet forwarding devices is equal to a first number of packet forwarding devices, wherein a sum of the set of second copies of the probe packet and the multiple response packets is equal to a second number of packets, and wherein the method further comprises initiating an alarm when the second number is less than the first number.

5. The method of claim 4, further comprising identifying at least one packet forwarding device, of the multiple other packet forwarding devices, for which a response packet was not received.

6. The method of claim 4, further comprising causing at least one packet forwarding device, of the multiple other packet forwarding devices, for which a response packet was not received to be reset.

7. A first packet forwarding device, comprising:
one or more memories; and
one or more processors to:
obtain, by an ingress component of the first packet forwarding device, a probe packet associated with a multicast packet;
transmit, from the ingress component and through an egress component of the first packet forwarding device, the probe packet to a multicast replication component of the first packet forwarding device;
replicate, by the multicast replication component associated with the egress component of the first packet forwarding device, the probe packet at least two times to form multiple replicated probe packets,
wherein a first replication generates a set of first copies of the multiple replicated probe packets that is associated with a fabric replication of the probe packet, and wherein second replication generates a set of second copies of the multiple replicated probe packets that is associated with a local replication, of the probe packet, that is associated with each wide area network (WAN) port on a local replication list,
wherein the set of second copies egress via the WAN ports associated with the first packet forwarding device;
transmit, by the first packet forwarding device to the first packet forwarding device the set of second copies of the probe packet;
transmit a replicated probe packet, of the set of first copies, to each of multiple packet forwarding devices via a respective output queue;
receive, in response to transmitting the set of first copies, one or more response packets; and
determine, based on the set of second copies and the one or more response packets, a liveness of output queues.

8. The first packet forwarding device of claim 7, wherein the one or more processors, to receive the one or more response packets, are to receive the one or more response packets via a loopback associated with the first packet forwarding device.

9. The first packet forwarding device of claim 7, wherein the one or more processors are further to identify at least one packet forwarding device, of the multiple packet forwarding devices, for which a response packet was not received.

10. The first packet forwarding device of claim 9, wherein the one or more processors are further to cause at least one packet forwarding device, of the multiple packet forwarding devices, for which a response packet was not received to be reset.

11. The first packet forwarding device of claim 9, wherein the first packet forwarding device is associated with an application-specific integrated circuit.

12. A packet forwarding system, comprising:
multiple packet forwarding devices, each packet forwarding device, of the multiple packet forwarding devices, including one or more memories and one or more processors to:
obtain, by an ingress component, a probe packet associated with a multicast packet;
transmit, from the ingress component and through an egress component, the probe packet to a multicast replication component;
replicate, by the multicast replication component associated with the egress component the probe packet at least two times to form multiple copies of the probe packet,
wherein a first replication generates a set of first copies of the multiple copies that is associated with a fabric replication of the probe packet, and
wherein a second replication generates a set of second copies of the multiple copies that is associated with a local replication, of the probe packet, that is associated with each wide area network (WAN) port on a local replication list,
wherein the set of second copies egress via the WAN ports;
transmit, to other packet forwarding devices of the multiple packet forwarding devices, the set of first copies of the probe packet;
receive multiple response packets, wherein each of the multiple response packets originates at a respective one of the other packet forwarding devices based on a respective one of the other packet forwarding devices receiving one of the set of first copies of the probe packet; and determine, based on the set of second copies of the probe packet and the multiple response packets, a reachability of multiple links associated with the multiple packet forwarding devices.

13. The packet forwarding system of claim 12, wherein the multiple links are associated with multiple output queues, and wherein each output queue, of the multiple output queues, is associated with one of the other packet forwarding devices.

14. The packet forwarding system of claim 12, wherein the one or more processors, to receive the multiple response packets, are to receive the multiple response packets via a loopback associated with the packet forwarding device.

15. The packet forwarding system of claim 12, wherein a number of the multiple packet forwarding devices is equal to a first number of packet forwarding devices, wherein a sum of the multiple response packets and one is equal to a second number of packets, and wherein the one or more processors are further to initiate an alarm when the second number is less than the first number.

16. The packet forwarding system of claim 15, wherein the one or more processors are further to at least one of:

identify at least one packet forwarding device, of the other packet forwarding devices, for which a response packet was not received, or cause at least one packet forwarding device, of the other packet forwarding devices, for which a response packet was not received to be reset.

* * * * *